(12) United States Patent
Agrawal et al.

(10) Patent No.: US 12,131,009 B2
(45) Date of Patent: Oct. 29, 2024

(54) CONFIGURING AN EXTERNAL PRESENTATION DEVICE BASED ON USER HANDEDNESS

(71) Applicant: Motorola Mobility LLC, Chicago, IL (US)

(72) Inventors: Amit Kumar Agrawal, Bangalore (IN); Jyothsna Bandameedipalli, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/575,338

(22) Filed: Jan. 13, 2022

(65) Prior Publication Data

US 2023/0221838 A1   Jul. 13, 2023

(51) Int. Cl.
 G06F 3/0484 (2022.01)
 G06F 9/451 (2018.01)

(52) U.S. Cl.
 CPC .......... G06F 3/0484 (2013.01); G06F 9/453 (2018.02)

(58) Field of Classification Search
 CPC ............................. G06F 3/0484; G06F 9/453
 See application file for complete search history.

(56) References Cited

U.S. PATENT DOCUMENTS

| | | | |
|---|---|---|---|
| 8,493,342 B2 | 7/2013 | Park et al. | |
| 8,769,431 B1* | 7/2014 | Prasad | G06F 3/0488 715/764 |
| 8,924,894 B1 | 12/2014 | Yaksick et al. | |
| 9,401,984 B1 | 7/2016 | Alameh et al. | |
| 9,632,595 B2* | 4/2017 | Park | G06F 3/0488 |
| 9,851,883 B2 | 12/2017 | Terrero et al. | |
| 10,373,589 B2* | 8/2019 | Ota | G09G 5/003 |
| 10,467,017 B2* | 11/2019 | Klein | G06F 1/1677 |
| 10,572,007 B2 | 2/2020 | Agarwal et al. | |
| 10,673,691 B2* | 6/2020 | Khosropour | H04L 41/0803 |
| 10,817,173 B2 | 10/2020 | Debates et al. | |
| 10,831,318 B2 | 11/2020 | Liu et al. | |
| 10,936,011 B2* | 3/2021 | Yamada | G06F 3/04886 |
| 11,275,405 B2* | 3/2022 | Hotelling | G06F 3/0485 |
| 11,513,604 B2 | 11/2022 | Jain et al. | |

(Continued)

OTHER PUBLICATIONS

"Final Office Action", U.S. Appl. No. 16/903,717, filed Jun. 7, 2021, 13 pages.

(Continued)

*Primary Examiner* — Tadesse Hailu
(74) *Attorney, Agent, or Firm* — FIG. 1 Patents

(57) ABSTRACT

A mobile device communicates content to an external presentation device, such as a display device, for display or other presentation at the external presentation device. The mobile device identifies a user handedness of a user of the mobile device. One or more configuration settings for a user interface of the external presentation device are determined based on the user handedness of the user. These configuration settings are, for example, settings for any of various user interface elements displayed by the external presentation device such as icons, buttons, menus, widgets, and so forth. The configuration settings are communicated to the external presentation device, allowing the external presentation device to be configured for or adapted to the user handedness of the user.

20 Claims, 12 Drawing Sheets

(56) References Cited

U.S. PATENT DOCUMENTS

| | | | |
|---|---|---|---|
| 11,726,734 B2 | 8/2023 | Bandameedipalli et al. | |
| 2006/0197750 A1* | 9/2006 | Kerr | G06F 1/1647 |
| | | | 345/173 |
| 2010/0117975 A1 | 5/2010 | Cho | |
| 2010/0153313 A1* | 6/2010 | Baldwin | G06F 1/1626 |
| | | | 715/764 |
| 2010/0299390 A1* | 11/2010 | Alameh | G06F 3/0304 |
| | | | 709/204 |
| 2011/0082620 A1 | 4/2011 | Small et al. | |
| 2011/0117970 A1 | 5/2011 | Choi | |
| 2011/0134030 A1* | 6/2011 | Cho | G06F 3/038 |
| | | | 345/157 |
| 2012/0032979 A1 | 2/2012 | Blow et al. | |
| 2012/0060092 A1* | 3/2012 | Hill | H04N 21/4882 |
| | | | 715/716 |
| 2012/0075351 A1 | 3/2012 | Imai et al. | |
| 2012/0146901 A1* | 6/2012 | Ujiie | G06F 3/0346 |
| | | | 345/157 |
| 2013/0038564 A1 | 2/2013 | Ho | |
| 2013/0155095 A1* | 6/2013 | Hussain | H04N 21/42224 |
| | | | 345/619 |
| 2013/0159931 A1 | 6/2013 | Lee et al. | |
| 2013/0201155 A1* | 8/2013 | Wu | G06F 3/03547 |
| | | | 345/173 |
| 2013/0278552 A1* | 10/2013 | Kamin-Lyndgaard | |
| | | | G06F 3/04883 |
| | | | 345/173 |
| 2013/0321712 A1* | 12/2013 | Wu | H04N 21/4781 |
| | | | 348/734 |
| 2013/0324093 A1 | 12/2013 | Santamaria et al. | |
| 2013/0342672 A1 | 12/2013 | Gray et al. | |
| 2014/0051406 A1 | 2/2014 | Kim et al. | |
| 2014/0101545 A1* | 4/2014 | Paek | G06F 3/0488 |
| | | | 715/702 |
| 2014/0108936 A1* | 4/2014 | Khosropour | H04L 41/0803 |
| | | | 715/735 |
| 2014/0184511 A1* | 7/2014 | Puustinen | G06F 3/04886 |
| | | | 345/168 |
| 2014/0184519 A1* | 7/2014 | Benchenaa | G06F 1/1626 |
| | | | 345/173 |
| 2014/0229848 A1* | 8/2014 | Zhang | H04M 1/72448 |
| | | | 715/745 |
| 2014/0282728 A1* | 9/2014 | Matsunaga | H04M 1/72412 |
| | | | 725/38 |
| 2014/0340334 A1* | 11/2014 | Cho | G06F 3/041 |
| | | | 345/173 |
| 2015/0121215 A1 | 4/2015 | Wohlert et al. | |
| 2015/0220218 A1* | 8/2015 | Jeon | G06F 3/0488 |
| | | | 715/825 |
| 2015/0229749 A1 | 8/2015 | Cho et al. | |
| 2015/0261376 A1 | 9/2015 | Kim et al. | |
| 2015/0363086 A1 | 12/2015 | Uno | |
| 2016/0062515 A1 | 3/2016 | Bae et al. | |
| 2016/0077616 A1* | 3/2016 | Durojaiye | G06F 3/041 |
| | | | 345/173 |
| 2016/0110098 A1 | 4/2016 | Stewart et al. | |
| 2016/0165395 A1 | 6/2016 | Long et al. | |
| 2016/0291731 A1 | 10/2016 | Liu et al. | |
| 2016/0313966 A1 | 10/2016 | Jeong et al. | |
| 2016/0320866 A1 | 11/2016 | Parham | |
| 2016/0320966 A1 | 11/2016 | Ryu et al. | |
| 2017/0011210 A1 | 1/2017 | Cheong et al. | |
| 2017/0032787 A1 | 2/2017 | Dayal | |
| 2017/0048576 A1* | 2/2017 | Kim | H04N 21/41265 |
| 2017/0060391 A1* | 3/2017 | Jun | G06F 3/0482 |
| 2017/0060398 A1* | 3/2017 | Rastogi | G06F 3/0482 |
| 2017/0102872 A1 | 4/2017 | Kim et al. | |
| 2017/0180672 A1* | 6/2017 | Lee | G06F 3/0346 |
| 2017/0192642 A1* | 7/2017 | Fishman | G06F 3/0485 |
| 2017/0212631 A1 | 7/2017 | Kim et al. | |
| 2017/0228125 A1* | 8/2017 | Lee | G06F 3/04845 |
| 2017/0231148 A1 | 8/2017 | Miwa | |
| 2017/0365189 A1 | 12/2017 | Halpin et al. | |
| 2017/0366555 A1 | 12/2017 | Matus | |
| 2018/0095653 A1 | 4/2018 | Hasek | |
| 2018/0181245 A1* | 6/2018 | Beck | G06F 3/04883 |
| 2018/0239482 A1 | 8/2018 | Hinckley | |
| 2018/0242242 A1 | 8/2018 | Lee et al. | |
| 2018/0329605 A1* | 11/2018 | Venkateswararao | G06F 9/451 |
| 2019/0018461 A1 | 1/2019 | Debates et al. | |
| 2019/0018588 A1 | 1/2019 | Debates et al. | |
| 2019/0020760 A1 | 1/2019 | Debates et al. | |
| 2019/0038260 A1* | 2/2019 | Lee | A61B 8/00 |
| 2019/0052744 A1 | 2/2019 | Jung et al. | |
| 2019/0075355 A1* | 3/2019 | VanBlon | H04N 21/43615 |
| 2019/0179487 A1 | 6/2019 | Kong et al. | |
| 2020/0201501 A1 | 6/2020 | Rho et al. | |
| 2020/0241687 A1* | 7/2020 | Han | G06F 3/02 |
| 2020/0366968 A1 | 11/2020 | Calkins | |
| 2020/0389691 A1* | 12/2020 | Yoshizawa | H04N 21/42222 |
| 2021/0034222 A1* | 2/2021 | Brems | G06T 19/006 |
| 2021/0385417 A1 | 12/2021 | Park et al. | |
| 2021/0397264 A1 | 12/2021 | Aman et al. | |
| 2022/0187870 A1* | 6/2022 | Hotelling | G06F 3/0412 |
| 2022/0382407 A1* | 12/2022 | Baker | G06F 3/0416 |
| 2023/0014995 A1 | 1/2023 | Sharma et al. | |
| 2023/0221911 A1 | 7/2023 | Bandameedipalli et al. | |

OTHER PUBLICATIONS

"Final Office Action", U.S. Appl. No. 17/025,170, filed Dec. 7, 2021, 9 pages.
"Non-Final Office Action", U.S. Appl. No. 16/903,717, filed Mar. 15, 2022, 12 pages.
"Non-Final Office Action", U.S. Appl. No. 17/025,170, filed Jun. 18, 2021, 10 pages.
"Non-Final Office Action", U.S. Appl. No. 16/944,007, filed Nov. 9, 2021, 15 pages.
"Non-Final Office Action", U.S. Appl. No. 16/903,717, filed Nov. 10, 2020, 11 pages.
"Non-Final Office Action", U.S. Appl. No. 17/002,027, filed Nov. 23, 2021, 13 pages.
"Non-Final Office Action", U.S. Appl. No. 17/025,131, filed Dec. 7, 2021, 20 pages.
Bandameedipalli, Jyothsna, et al., "U.S. Application as Filed", U.S. Appl. No. 17/575,356, filed Jan. 13, 2022, 63 pages.
Jain, Aman, et al., "U.S. Application as Filed", U.S. Appl. No. 16/903,717, filed Jun. 17, 2020, 58 pages.
Russell, Brandon, "Galaxy S21 features wireless support for Samsung DeX on PC", XDA Developers Blog [online][retrieved Mar. 30, 2022]. Retrieved from the Internet <https://www.xda-developers.com/galaxy-s21-wireless-support-samsung-dex-on-pc/>., Feb. 5, 2021, 7 pages.
U.S. Appl. No. 17/575,356, "Notice of Allowance", U.S. Appl. No. 17/575,356, filed Mar. 30, 2023, 10 pages.
U.S. Appl. No. 16/903,717, "Notice of Allowance", U.S. Appl. No. 16/903,717, filed Sep. 21, 2022, 5 pages.
U.S. Appl. No. 16/903,717, "Supplemental Notice of Allowability", U.S. Appl. No. 16/903,717, filed Nov. 3, 2022, 2 pages.
U.S. Appl. No. 17/575,356, "Non-Final Office Action", U.S. Appl. No. 17/575,356, filed Oct. 5, 2022, 21 pages.
U.S. Appl. No. 17/575,356, "Supplemental Notice of Allowability", U.S. Appl. No. 17/575,356, filed Jun. 30, 2023, 2 pages.

* cited by examiner

CONFIGURING AN EXTERNAL PRESENTATION DEVICE BASED ON USER HANDEDNESS

BACKGROUND

As technology has advanced, electronic devices have become increasingly powerful and capable of performing a multitude of tasks. For instance, some electronic devices include a content redirection feature that allows content displayed on the electronic device to also be displayed on a larger device, such as a television or desktop monitor. This allows the user to view the content on a larger display than is provided on some electronic devices such as smartphones.

While these features have their benefits they are not without their problems. One such problem is that user interface settings associated with such larger displays are typically difficult to adjust. This makes it difficult for users to adjust the larger devices to their own preferences or needs, resulting in user frustration with their electronic devices as well as their larger devices.

BRIEF DESCRIPTION OF THE DRAWINGS

Aspects of notification handling based on identity and physical presence are described with reference to the following Figures. The same numbers may be used throughout to reference similar features and components that are shown in the Figures. Further, identical numbers followed by different letters reference different instances of features and components described herein.

DETAILED DESCRIPTION

Figure 1:
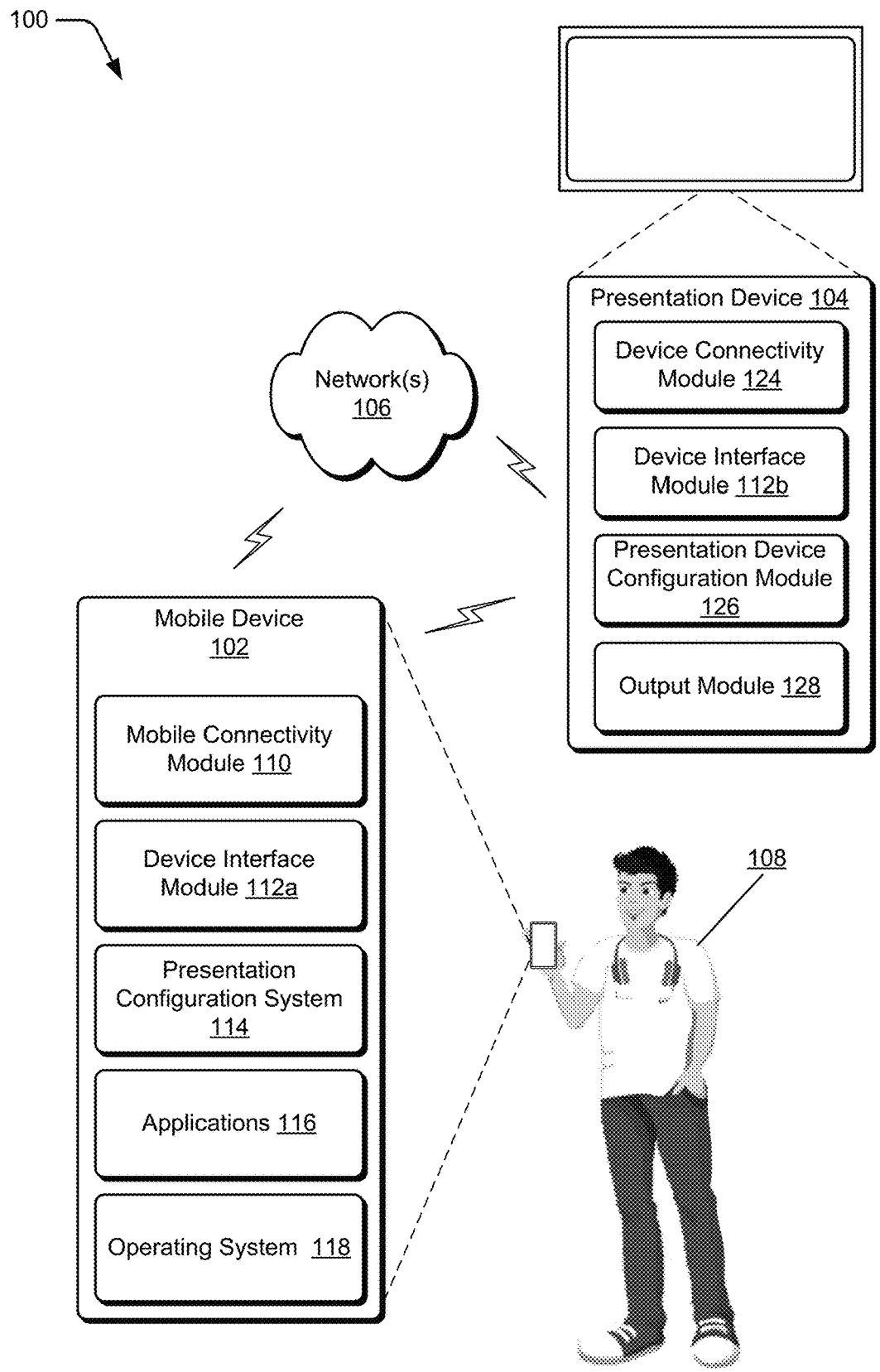
FIG. 1 illustrates an example environment in which aspects of configuring an external presentation device based on user handedness can be implemented.

Configuring an external presentation device based on user handedness is discussed herein. Generally, the techniques discussed herein are directed to communicating content for presentation from one device (e.g., a mobile device) to an external presentation device (e.g., a display device). The external presentation device is typically much larger (e.g., a desktop monitor or a television) so the content is displayed to the user on a bigger display than is typically as part of the mobile device.

In one or more implementations, the techniques discussed herein identify a user handedness of a user of the mobile device. This user handedness is determined, for example, based on the manner in which the user grips the mobile device. One or more configuration settings for a user interface of the external presentation device are determined based on the user handedness of the user. These configuration settings are, for example, settings for any of various user interface elements displayed by the external presentation device such as icons, buttons, menus, widgets, and so forth. The configuration settings are communicated to the external presentation device, allowing the external presentation device to be configured for or adapted to the user handedness of the user.

Additionally or alternatively, the techniques discussed herein identify an impairment of a user of the mobile device. The impairment of a user refers to a disability, deficiency, medical condition, and so forth the user has, such as a disability or deficiency that may make it difficult for the user to watch, hear, or otherwise consume content output by the external presentation device. Any of a variety of impairments can be determined by the impairment determination module, such as color blindness, a hearing loss or impairment, a visual impairment, and so forth. One or more configuration settings for a user interface of the external presentation device are determined based on the impairment of the user. These configuration settings are, for example, an indication of a particular audio level (e.g., on a scale of 1 to 10), an indication to perform text to speech, an indication of a particular type of color blindness, and so forth. The configuration settings are communicated to the external presentation device, allowing the external presentation device to be configured for or adapted to one or more impairments of the user.

The techniques discussed herein allow an external presentation device to be automatically configured to the user handedness of a user of a mobile device communicating content to the external presentation device for display or other presentation. Accordingly, any interaction the user may have with the external presentation device, such as touching the display of the external presentation device to activate a settings menu to adjust brightness of the external presentation device or to activate or deactivate certain functionality such as types of communication, result in the user interface of the external presentation device being displayed in a manner appropriate for the user handedness of the user. For example, certain buttons or widgets can be displayed on the right side of the user interface if the user handedness is right-handed and displayed on the left side of the user interface if the user handedness is left-handed. Thus, rather than being configured for the majority of users (e.g., right-handed users), the external presentation device is automatically configured for a user that is in the minority (e.g., a left-handed user) when using the external presentation device to display or otherwise present content from a mobile device.

The techniques discussed herein allow an external presentation device to be automatically configured to correct for impairments of the user of a mobile device communicating content to the external presentation device for display or other presentation. For example, audio is played back louder at the external presentation device if the user has a hearing loss or impairment, different color display settings can be used if the user has color blindness, text to speech can be performed if the user has a visual impairment, font or brightness adjustments can be made if the user has a visual impairment, and so forth. Thus, rather than being configured for the majority of users (e.g., users without such impairments), the external presentation device is automatically configured for a user that is in the minority (e.g., has such an impairment) when using the external presentation device to display or otherwise present content from a mobile device.

While features and concepts of the techniques discussed herein can be implemented in any number of environments and/or configurations, aspects of the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of Configuring an external presentation device based on user handedness can be implemented. The environment 100 includes a mobile device 102 and a presentation device 104 that are interconnectable in various ways to enable content from the mobile device 102 to be displayed or otherwise presented by the presentation device 104. The mobile device 102 and the presentation device 104, for instance, are interconnectable via a network 106 and/or via direct inter-device connectivity, e.g., via direct wireless and/or wired connectivity between the mobile device 102 and the presentation device 104. In this particular example, the mobile device 102 represents a portable device that can be carried by a user 108, such as a smartphone or a tablet device. The user 108, for instance, represents a registered user of the mobile device 102. As the presentation device 104 is implemented as a separate device from the mobile device 102, the presentation device 104 is also referred to as an external presentation device.

Further, the presentation device 104 represents functionality for various types of content output, such as output of visual content, audible content, combinations thereof, and so forth. The presentation device 104 can be implemented in various ways, such as a television (e.g., a smart TV), a display panel, a projector display, a computing device with an associated display device (e.g., the computing device 1200 discussed below with reference to FIG. 12), an audio speaker, and so forth. In at least one implementation the presentation device 104 represents a dedicated display device configured to output visual content generated by other devices, such as content generated at the mobile device 102 and transmitted to the presentation device 104 for display or other presentation. Alternatively or additionally the presentation device 104 includes computing functionality, such as discussed with reference to the computing device 1200. These examples are not to be construed as limiting, however, and the mobile device 102 and/or the presentation device 104 can be implemented in a variety of different ways and form factors. Example attributes of the mobile device 102 and the presentation device 104 are discussed below with reference to the device 1200 of FIG. 12.

The mobile device 102 includes various functionality that enables the mobile device 102 to perform different aspects of configuring an external presentation device based on user handedness discussed herein. In one or more implementations, the mobile device 102 includes a mobile connectivity module 110, a device interface module 112a, presentation configuration system 114, and applications 116. The mobile connectivity module 110 represents functionality (e.g., logic and hardware) for enabling the mobile device 102 to interconnect with other devices and/or networks, such as the presentation device 104 and the network 106. The mobile connectivity module 110, for instance, enables wireless and/or wired connectivity of the mobile device 102. The device interface module 112a represents functionality for enabling the mobile device 102 to interface with other devices. As further detailed below, for instance, the device interface module 112a enables the mobile device 102 to establish wireless and/or wired data communication with other devices, e.g., the presentation device 104.

The presentation configuration system 114 represents functionality for configuring or adapting a user interface of the presentation device 104 based on particular characteristics of the user 108. These characteristics of the user 108 include, for example, a handedness of the user 108 (e.g., whether the user is left-handed or right-handed), impairments of the user 108 (e.g., whether the user is color blind, whether the user has a hearing loss or impairment, whether the user has a visual impairment). Additionally or alternatively, the presentation configuration system represents functionality for configuring or adapting a user interface of the mobile device 102 based on particular characteristics of the user 108.

The applications 116 represent functionality for performing different computing tasks via the mobile device 102, such as gaming, media consumption (e.g., content streaming), productivity tasks (e.g., word processing, content generation, data analysis, etc.), content generation, web browsing, communication with other devices, and so forth.

The operating system 118 manages hardware, software, and firmware resources in the mobile device 102. The operating system 118 manages the applications 116 running on the mobile device 102 and operates as an interface between applications 116 and hardware components of the mobile device 102.

Each of the mobile connectivity module 110, the device interface module 112a, the presentation configuration system 114, the applications 116, and the operating system 118 can be implemented in a variety of different manners. For example, each of the mobile connectivity module 110, the device interface module 112a, the presentation configuration system 114, the applications 116, and the operating system 118 can be implemented as multiple instructions stored on computer-readable storage media and that can be executed by a processor system of the mobile device 102. Additionally or alternatively, each of the mobile connectivity module 110, the device interface module 112a, the presentation configuration system 114, the applications 116, and the operating system 118 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth). One or more of the mobile connectivity module 110, the device interface module 112a, the presentation configuration system 114, the applications 116, and the operating system 118 can be implemented in the same manner, or the mobile connectivity module 110, the device interface module 112a, the presentation configuration system 114, the applications 116, and the operating system 118 can each be implemented in a different manner.

The presentation device 104 includes various functionality that enables the presentation device 104 to perform different aspects of configuring an external presentation device based on user handedness discussed herein, including a device connectivity module 124, a device interface module 112b, a presentation device configuration module 126, and an output module 128. The device connectivity module 124 represents functionality (e.g., logic and hardware) for enabling the presentation device 104 to interconnect with other devices and/or networks, such as the mobile device 102 and the network 106. The device connectivity module 124, for instance, enables wireless and/or wired connectivity of the presentation device 104. Generally, the mobile device 102 and the presentation device 104 are configured to intercommunicate via a variety of different wireless protocols, such as wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The device interface module 112b represents functionality for enabling the presentation device 104 to interface with other devices. For instance, the device interface module 112b interfaces with the device interface module 112a of the mobile device 102 to enable collaborative data communication between the presentation device 104 and the mobile device 102.

The presentation device configuration module 126 represents functionality for configuring the presentation device 104 to output content. This configuration is performed at least in part in accordance with configuration settings received from the mobile device 102.

The output module 128 represents functionality for enabling content output by the presentation device 104, such as visual content and audible content. The output module 128, for instance, includes a display driver and/or other logic and hardware for outputting visual content on a display of the presentation device 104, an audio driver and/or other logic and hardware for outputting audio content via a speaker of the presentation device 104, and so forth. A display or speaker of the presentation device 104 to which the output module 128 outputs visual or audio content may be implemented as part of the presentation device 104 or separately from the presentation device 104 (e.g., receiving visual or audio content via any of a variety of wireless and/or wired connections).

Each of the device connectivity module 124, the device interface module 112b, the presentation device configuration module 126, and the output module 128 can be implemented in a variety of different manners. For example, each of the modules 124, 112b, 126, and 128 can be implemented as multiple instructions stored on computer-readable storage media and that can be executed by a processor system of the presentation device 104. Additionally or alternatively, each of the modules 124, 112b, 126, and 128 can be implemented at least in part in hardware (e.g., as an ASIC, an FPGA, an ASSP, an SoC, a CPLD, and so forth). One or more of the modules 124, 112b, 126, and 128 can be implemented in the same manner, or the modules 124, 112b, 126, and 128 can each be implemented in a different manner.

The mobile connectivity module 110 and the device connectivity module 124 interface to establish data connectivity between the mobile device 102 and the presentation device 104. Generally, the data connectivity is implemented via wireless and/or wired connectivity between the mobile device 102 and the presentation device 104 for exchanging data between the devices. The data connectivity, for instance, is implemented via direct wireless and/or wired connectivity between the mobile device 102 and the presentation device 104, and/or via data communication over the network 106 between the mobile device 102 and the presentation device 104. In a wireless scenario the data connectivity can be established as direct device-to-device connectivity between the mobile device 102 and the presentation device 104 and utilizing any suitable wireless protocol, such as Wi-Fi Direct, Bluetooth™ (including Bluetooth™ Low Energy (BLE), ultra-wideband (UWB), NFC, LTE direct, NR sidelink, and so forth.

Utilizing the data connectivity a connectivity session is established between the mobile device 102 and the presentation device 104 that enables the mobile device 102 to communicate output content to the presentation device 104 for output. In one or more implementations the connectivity session is established via intercommunication between the device interface module 112a of the mobile device 102 and the device interface module 112b of the presentation device 104. The output content can take various forms such as digital video, images, audio, application interfaces, etc. In one or more implementations the output content is generated by an instance of the applications 116. Accordingly, the output module 128 of the presentation device 104 causes the output content to be output via the presentation device 104.

The output content received by the presentation device 104 from the mobile device 102 is output by the output module 128 in a full-screen mode (taking up the entirety of the user interface display of the presentation device 104) or in a windowed mode (e.g., in a window displayed of the user interface display of the presentation device 104).

The mobile device 102 provides any of various types of content to the presentation device 104. In one or more implementations, the mobile device 102 outputs to the presentation device 104 whatever content is being displayed on a displayed of the mobile device 102 (e.g., also referred to as a mirror mode). In such situations the presentation device 104 displays the same content as the mobile device 102 but in larger due to the larger size of the display of the presentation device 104. Additionally or alternatively, the mobile device 102 outputs to the presentation device 104 content from an application 116 or a program of the operating system 118 without displaying the content on a display of the mobile device 102. For example, an application 116 may receive content that is a movie from a remote server via the network 106 and provide that content to the presentation device 104 for presentation at the presentation device 104 without displaying or otherwise presenting the content at the mobile device 102.

Figure 2:
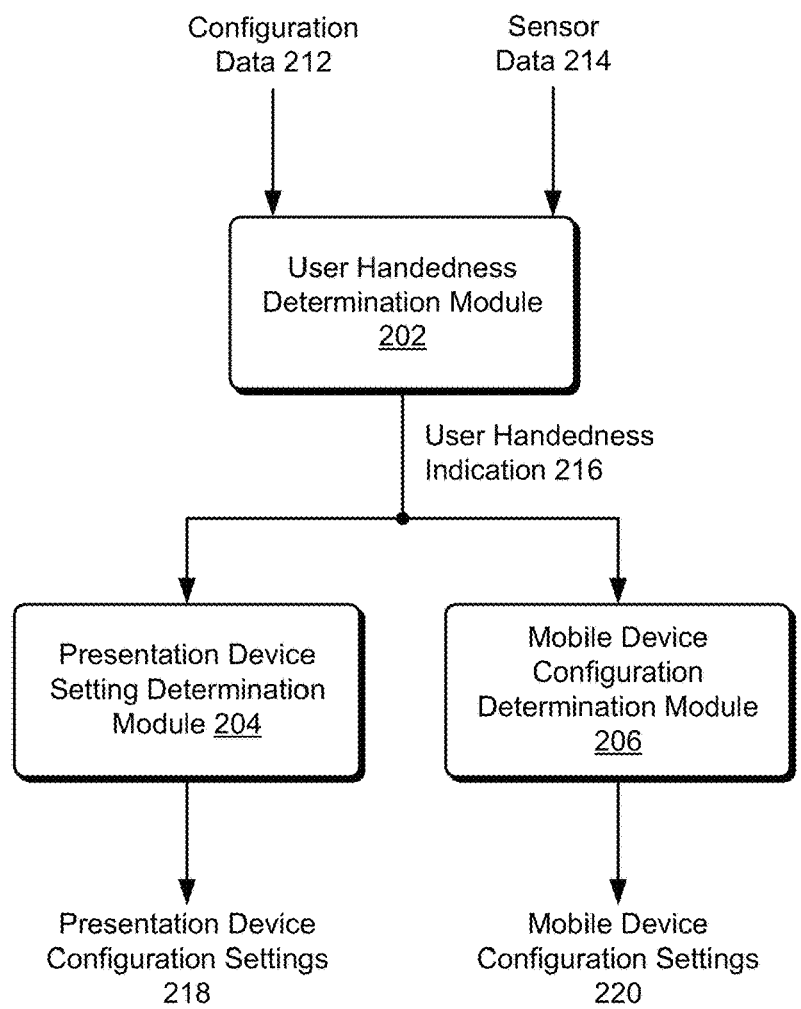
FIG. 2 illustrates an example system implementing the techniques discussed herein.

FIG. 2 illustrates an example system 200 implementing the techniques discussed herein. The system 200 is, for example, included as part of the presentation configuration system 114. The system 200 includes a user handedness determination module 202, a presentation device setting determination module 204, and a mobile device configuration determination module 206. Generally, the system 200 determines the user handedness of the user 108 and outputs configuration settings for the mobile device 102 or the presentation device 104 that are based on the determined user handedness.

More specifically, the user handedness determination module 202 receives one or both of configuration data 212 and sensor data 214 and based on the received data determines a user handedness of the user 108. In one or more implementations, the user handedness of a user refers to which hand the user uses habitually or more easily than the other. Additionally or alternatively, the user handedness of a user refers to which hand the user is currently using or prefers using in certain situations (e.g., which hand the user is currently holding the mobile device 102 with).

The sensor data 214 is data received from various sensors of the mobile device 102. In one or more implementations, the sensor data 214 includes data from one or more touch sensors of the mobile device 102 that indicates, at any given time, which sensors or portions of sensors are being touched. The touch sensors may be included as part of a touchscreen of the mobile device 102 or as other touch sensors of the mobile device 102. Additionally or alternatively, the sensor data 214 includes data from one or more other types of sensors, such as an accelerometer, a gyroscope, a camera, a microphone, biometric sensors, position sensors, and so forth.

In one or more implementations, the user handedness determination module 202 detects a device grip position of a user grip holding the mobile device 102 based on the sensor data 214. Typically, a user grips and holds a user handedness determination module 202 with his or her thumb on one side, and two or three fingers on the other side of the user handedness determination module 202, which also likely contacts or rests in some portion of the user's palm of his or her hand. The user handedness determination module 202 determines which hand, left or right, the user is using to hold the device. The user handedness determination module 202 can determine a thumb region of the device grip position on a first side of the mobile device 102 and also determine a a finger region of the device grip position on a second side of the mobile device 102. In instances when a user changes hands used to hold the mobile device 102 the user handedness determination module 202 can detect a change in the device grip position of the user grip holding the wireless device.

Figure 3:
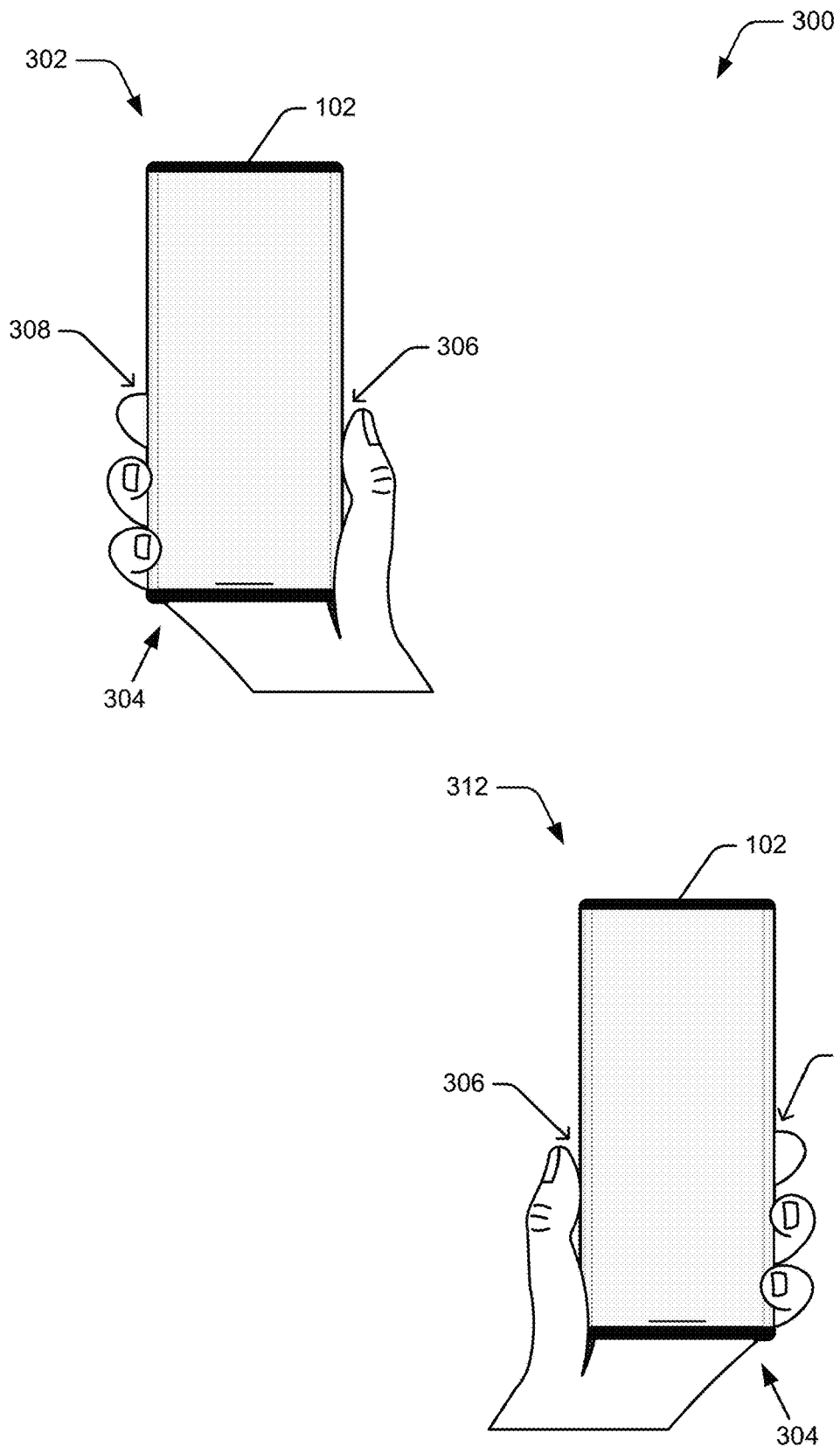
FIG. 3 illustrates examples of device grip position using a mobile device as an example.

FIG. 3 illustrates examples 300 of device grip position using the mobile device 102 as an example. As shown in an example 302, a user of the mobile device 102 may hold the device in his or her right hand. The user handedness determination module 202 can detect the device grip position 304 of the user grip holding the mobile device 102. The user handedness determination module 202 can determine a thumb region 306 of the device grip position 304 on a first (e.g., right) side of the mobile device and also determine a finger region 308 of the device grip position 304 on a second (e.g., left) side of the mobile device. Given these determined thumb and finger regions, the user handedness determination module 202 can readily determine, for example, that the user is using his right hand to hold the mobile device 102 in the example 302.

An example 312 illustrates an instance of the user changing hands to hold the device in his or her left hand, and the user handedness determination module 202 can detect the change in the device grip position 304 of the user grip holding the mobile device 102. The user handedness determination module 202 can determine a thumb region 306 of the device grip position 304 on the second (e.g., left) side of the mobile device and also determine a finger region 308 of the device grip position 304 on the first (e.g., right) side of the mobile device. Given these determined thumb and finger regions, the user handedness determination module 202 can readily determine, for example, that the user is using his left hand to hold the mobile device 102 in the example 312.

Returning to FIG. 2, the user handedness determination module 202 determines the user handedness of the user based on whether the user is using his left hand or right hand to hold the mobile device 102. In one or more implementations, the user handedness determination module 202 determines the user handedness based on the device grip position, such as the user handedness being left-handed if the user is using his left hand to hold the mobile device 102 and the user handedness being right-handed if the user is using his right hand to hold the mobile device 102.

Additionally or alternatively, in addition to which hand the user is using to hold the mobile device 102, the user handedness determination module 202 determines whether the user is using the mobile device 102 in a single-handed manner or in a multi-handed manner. This determination is made, for example, by determining whether the user is providing any additional touch input other than the finger and thumb regions used to detect the device grip position. For example, the user handedness determination module 202 determines whether an additional finger is touching the display (a touchscreen) of the mobile device 102. If an additional finger is touching the display of the mobile device 102, then the user handedness determination module 202 determines that the user is using the mobile device 102 in a multi-handed manner. However, if an additional finger is not touching the display of the mobile device 102, then the user handedness determination module 202 determines that the user is using the mobile device 102 in a single-handed manner.

The user handedness determination module 202 determines the user handedness based on whether user is using the mobile device 102 in a single-handed or multi-handed manner. If the user is using the mobile device 102 in a single-handed manner, then the user handedness of the user is the hand that is being used to hold the phone. E.g., if the user is holding the device in his left hand in a single-handed manner, then the user handedness of the user is left-handed. However, if the user is using the mobile device 102 in a multi-handed manner, then the user handedness of the user is the hand that is not being used to hold the phone. E.g., if the user is holding the device in his left hand in a multi-handed manner, then the user handedness of the user is right-handed.

In one or more implementations, the user handedness determination module 202 receives the configuration data 212. The configuration data 212 includes various configuration or setting data for the mobile device 102 and in one or more implementations the configuration data 212 includes an indication of the handedness of the user of the mobile device 102. The configuration data 212 can be obtained from any of a variety of sources, such as from the user (e.g., user input preferences), from a local or remote store of data regarding the user, from an algorithm or machine learning system that learns which hand the user prefers to use in which situations (e.g., which applications 116 the user prefers to use left-handed and which applications 116 the user prefers to use right-handed), and so forth. Accordingly, the configuration data 212 identifies the handedness of the user to the user handedness determination module 202.

The user handedness determination module 202 outputs an indication of the user handedness of the user as user handedness indication 216 to one or both of the presentation device setting determination module 204 and the mobile device configuration determination module 206. The presentation device setting determination module 204 generates configuration settings for the presentation device 104 based on the user handedness indication 216 and outputs these settings to the presentation device 104 as presentation device configuration settings 218.

In one or more implementations, the presentation device configuration settings 218 are configuration settings for the presentation device 104 that adapt or configure the presentation of data by the presentation device 104 in accordance with the user handedness indicated by the user handedness indication 216. These configuration settings are, for example, settings for any of various user interface elements displayed by the presentation device 104 such as icons, buttons, menus, widgets, and so forth.

The presentation device setting determination module 204 determines the configuration settings for a particular user handedness in any of a variety of different manners. In one or more implementations, the presentation device setting determination module 204 is configured with default configuration settings, such as by a developer or designer of the system 200. Additionally or alternatively, the presentation device setting determination module 204 receives user input specifying particular settings for particular user handedness. For example, a left-handed user may provide input (e.g., via a preferences setting user interface) of any of various user interface element settings. Additionally or alternatively, the presentation device setting determination module 204 obtains configuration settings from external sources, such as a remote server or other device (e.g., that performs crowdsourcing to receive configuration settings from various other users).

The presentation device configuration settings 218 are output to the presentation device 104 to configure or adapt the presentation device 104 to the user handedness of the user 108. For example, the presentation configuration system 114 of FIG. 1 provides the presentation device configuration settings 218 to the presentation device 104, such as by using the mobile connectivity module 110 and the device connectivity module 124. The presentation device configuration module 126 receives the presentation device configuration settings 218 and adapts or configures the user interface of the presentation device 104 to the user handedness of the user 108 using the presentation device configuration settings 218.

The presentation device configuration settings 218 are any of a variety of different settings for the presentation device 104 that may be configured differently based on the user handedness of the user. In one or more implementations, the presentation device configuration settings 218 include settings for the location where user interface elements (e.g., actionable items) such as icons, buttons, menus, widgets, and so forth are displayed on the presentation device 104. For example, minimize, maximize, and close buttons for a window may be displayed on the left side of the window for left-handed user handedness and on the right side of the window for right-handed user handedness. By way of another example, various buttons or other actionable items are displayed on the left side of the display for left-handed user handedness and on the right side of the display for right-handed user handedness. Additionally or alternatively, the presentation device configuration settings 218 include settings indicating which side of a finger or stylus a menu is displayed. For example, when a finger or stylus is detected touching a location on a touchscreen of the presentation device 104, a menu is displayed on the right side of the finger or stylus for left-handed user handedness and on the left side of the finger or stylus for right-handed user handedness. Additionally or alternatively, the presentation device configuration settings 218 include settings indicating a tilt angle of a pointer displayed on the presentation device 104. For example, a pointer is displayed tilted to the right for left-handed user handedness and tilted to the left for right-handed user handedness.

Additionally or alternatively, the presentation device setting determination module 204 provides as presentation device configuration settings 218 an indication of the user handedness of the user. In such situations, the presentation device configuration module 126 is configured with the appropriate configuration settings for the presentation device 104 for the user handedness of the user without needing those configuration settings to be provided by the mobile device 102. The presentation device configuration module 126 is configured with the appropriate configuration settings for the user handedness of the user in any of various manners, such as by a developer or designer of the presentation device 104 or the presentation device configuration module 126. Additionally or alternatively, the presentation device configuration module 126 receives user input (from the user 108 or another user) specifying particular settings for particular user handedness. For example, a left-handed user may provide input (e.g., via a preferences setting user interface) of any of various user interface element settings. Additionally or alternatively, the presentation device configuration module 126 obtains configuration settings from other external sources, such as a remote server or other device (e.g., that performs crowdsourcing to receive configuration settings from various other users).

Figure 4:
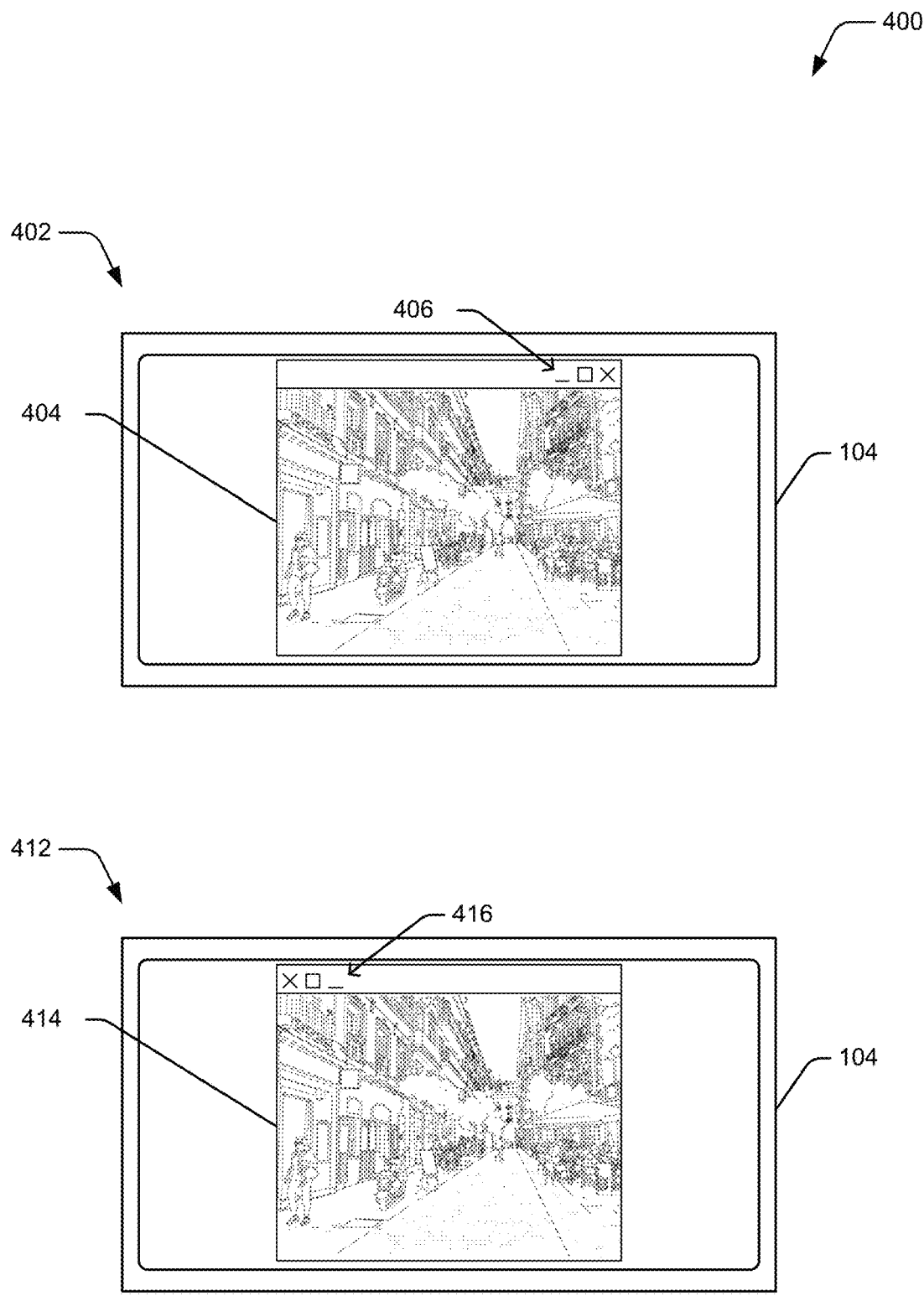
FIG. 4 illustrates examples of implementing configuration settings in a presentation device for user handedness.

FIG. 4 illustrates examples 400 of implementing configuration settings in a presentation device for user handedness. As shown in example 402, a movie is being played back in a window 404. The audio and video content of the movie is received by the presentation device 104 from the mobile device 102. The window includes a control bar at the top that includes buttons 406. The buttons 406 include a horizontal line button that is user-selectable to minimize the window 404, a square button that is user-selectable to maximize the window 404, and an "X" button that is user-selectable to close the window 404. The example 402 illustrates configuration settings for right-handed user handedness with the buttons 406 being located at the right side of the window 404.

Example 412 also shows a movie being played back in a window 414. The audio and video content of the movie is received by the presentation device 104 from the mobile device 102. The window includes a control bar at the top that includes buttons 416, analogous to the buttons 406 of example 402. However, the example 412 illustrates configuration settings for left-handed user handedness with the buttons 416 being located at the left side of the window 414.

Figure 5:
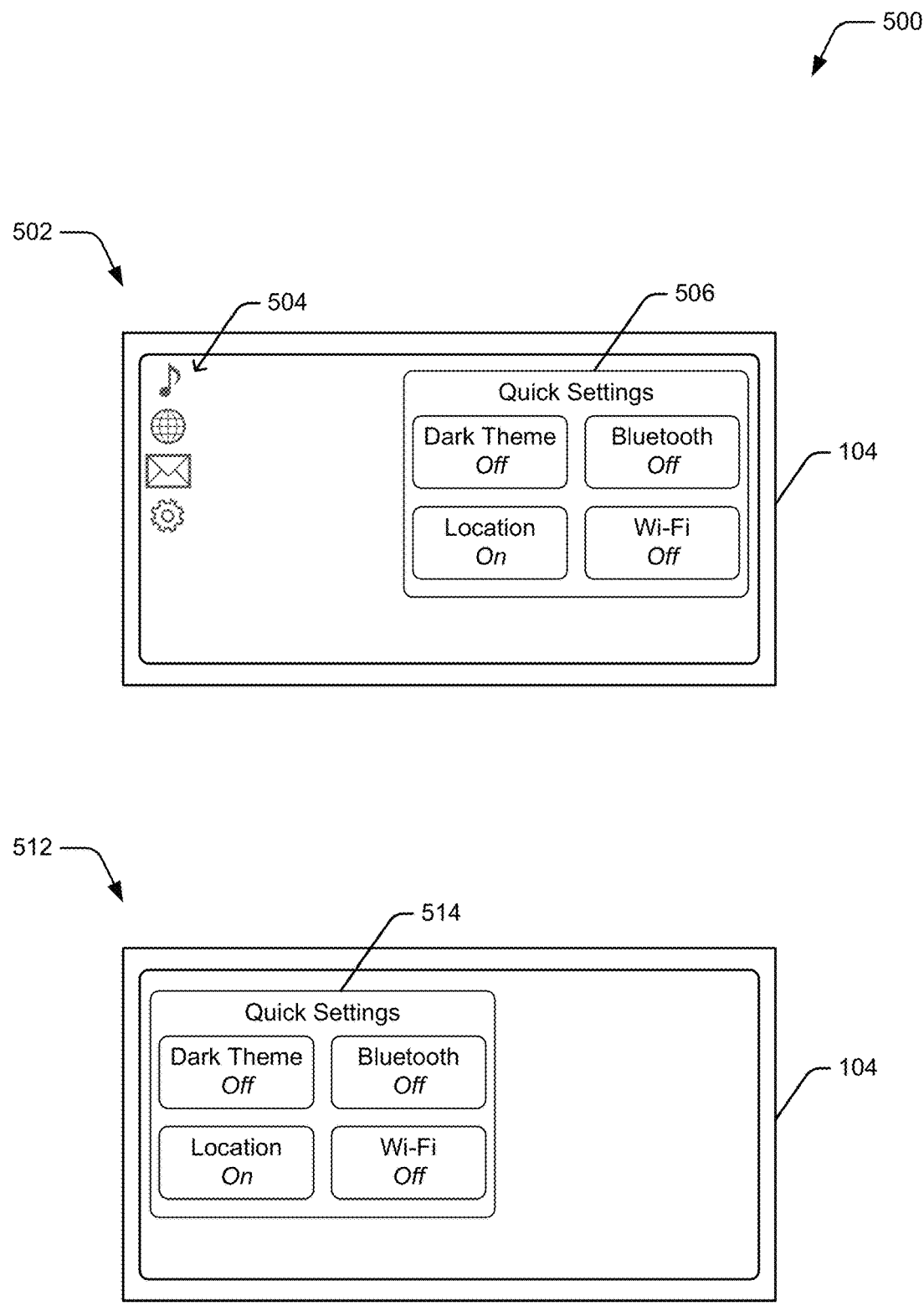
FIG. 5 illustrates examples of implementing configuration settings in a presentation device for user handedness.

FIG. 5 illustrates examples 500 of implementing configuration settings in a presentation device for user handedness. As shown in example 502, a set of icons or widgets 504 are displayed on a desktop user interface of the presentation device 104. These icons or widgets 504 as illustrated include a musical note (e.g., user-selectable to launch a music playback application), a globe (e.g., user-selectable to launch a web browsing application), an envelope (e.g., user-selectable to launch an email application), and a gear (e.g., user-selectable to launch a device settings application). A quick settings window 506 also displays user-selectable buttons to enable or disable various settings for the presentation device 104. These user-selectable buttons as illustrated include a "Dark Theme" button (e.g., user-selectable to enable or disable a dark theme for the user interface of the presentation device 104), a "Bluetooth" button (e.g., user-selectable to enable or disable Bluetooth communication for the presentation device 104), a "Wi-Fi" button (e.g., user-selectable to enable or disable Wi-Fi communication for the presentation device 104), and a "Location" button (e.g., user-selectable to enable or disable location tracking by the presentation device 104). The example 502 illustrates configuration settings for right-handed user handedness with the quick settings window 506 being located at the right side of the user interface displayed on the presentation device 104.

Example 512 also shows a quick settings window 514 being displayed on the user interface of the presentation device 104 including the same buttons as the quick settings window 506 in example 502. However, the example 512 illustrates configuration settings for left-handed user handedness with the quick settings window 506 being located at the left side of the window 514. Although not illustrated in the example 512, additionally or alternatively the icons 504 in the example 502 are also displayed on the user interface of the presentation device 104, but on the right side of the user interface.

Returning to FIG. 1, a connectivity session is established between the mobile device 102 and the presentation device 104. In one or more implementations, the presentation device configuration settings 218 are output to the presentation device 104 at the beginning of the connectivity session. For example, while establishing the connectivity session, or within a threshold amount of time of establishing the connectivity session (e.g., five seconds), the system 200 generates the presentation device configuration settings 218, which the mobile connectivity module 110 can provide to the presentation device 104. The presentation device 104 uses those presentation device configuration settings 218 for the duration of the connectivity session.

In one or more implementations, the presentation device configuration module 126 maintains a record of the configuration settings of the presentation device 104 prior to receipt of the presentation device configuration settings 218. At the end of the connectivity session (e.g., when the mobile connectivity module 110 and the device connectivity module 124 disconnect from one another), the presentation device configuration module 126 returns the presentation device 104 to the configuration settings the presentation device 104 had prior to receipt of the presentation device configuration settings 218. Additionally or alternatively, the presentation device 104 continues to use the presentation device configuration settings 218 until instructed otherwise, such as via user-input at the presentation device 104, receipt of new presentation device configuration settings 218 from the mobile device 102 or another mobile device, and so forth.

It is to be appreciated that the presentation device configuration settings 218 can change during a connectivity session. For example, the user 108 may change which hand he is using to hold the mobile device 102 in response to which a change in presentation device configuration settings 218 is provided to the presentation device 104 to reflect the change in user handedness.

Returning to FIG. 2, in one or more implementations the user handedness determination module 202 outputs the user handedness indication 216 to the mobile device configuration determination module 206. The mobile device configuration determination module 206 generates configuration settings for the mobile device 102 based on the user handedness indication 216 and outputs these settings as mobile device configuration settings 220. The mobile device configuration settings 220 are provided to an application 116 or the operating system 118 to configure or adapt the mobile device 102 to the user handedness of the user 108.

In one or more implementations, the mobile device configuration settings 220 are any of a variety of different settings for the mobile device 102 that may be configured differently based on the user handedness of the user. In one or more implementations, the mobile device configuration settings 220 include settings for the location where user interface elements (e.g., actionable items) such as icons, buttons, menus, widgets, and so forth are displayed on a display of the mobile device 102. For example, minimize, maximize, and close buttons for a window may be displayed on the left side of the window for left-handed user handedness and on the right side of the window for right-handed user handedness. By way of another example, various buttons or other actionable items are displayed on the left side of the display for left-handed user handedness and on the right side of the display for right-handed user handedness. Additionally or alternatively, the mobile device configuration settings 220 include settings indicating which side of a finger or stylus a menu is displayed. For example, when a finger or stylus is detected touching a location on a touchscreen of the mobile device 102, a menu is displayed on the right side of the finger or stylus for left-handed user handedness and on the left side of the finger or stylus for right-handed user handedness.

Additionally or alternatively, the mobile device configuration determination module 206 provides as mobile device configuration settings 220 an indication of the user handedness of the user. In such situations, an application 116 or program of the operating system 118 is configured with the appropriate configuration settings for the mobile device 102 for the user handedness of the user without needing those configuration settings to be provided by the system 200. The application 116 or program of the operating system 118 is configured with the appropriate configuration settings for the user handedness of the user in any of various manners, such as by a developer or designer of the mobile device 102, the application 116, or the program of the operating system 118. Additionally or alternatively, the application 116 or the program of the operating system 118 receives user input (from the user 108 or another user) specifying particular settings for particular user handedness. For example, a left-handed user may provide input (e.g., via a preferences setting user interface) of any of various user interface element settings. Additionally or alternatively, the application 116 or the program of the operating system 118 obtains configuration settings from other external sources, such as a remote server or other device (e.g., that performs crowdsourcing to receive configuration settings from various other users).

In one or more implementations, in situations in which the mobile device 102 outputs to the presentation device 104 content from an application 116 or a program of the operating system 118 without displaying the content on a display of the mobile device 102, an application 116 or program of the operating system 118 displays a user interface on the display of the mobile device 102 to facilitate interaction with and seamlessly manage the content presented at the presentation device 104. Examples of such user interface include a remote control, a virtual trackpad, a game mode controller, and so forth. For example, an application 116 may receive content that is a movie from a remote server via the network 106 and provide that content to the presentation device 104 for presentation at the presentation device 104. In this example, the applications 116 further generates a user interface, such as for a remote control, so that the mobile device 102 operates as a remote control to pause, fast forward, rewind, and so forth the movie during playback of the move by the presentation device 104.

Figure 6:
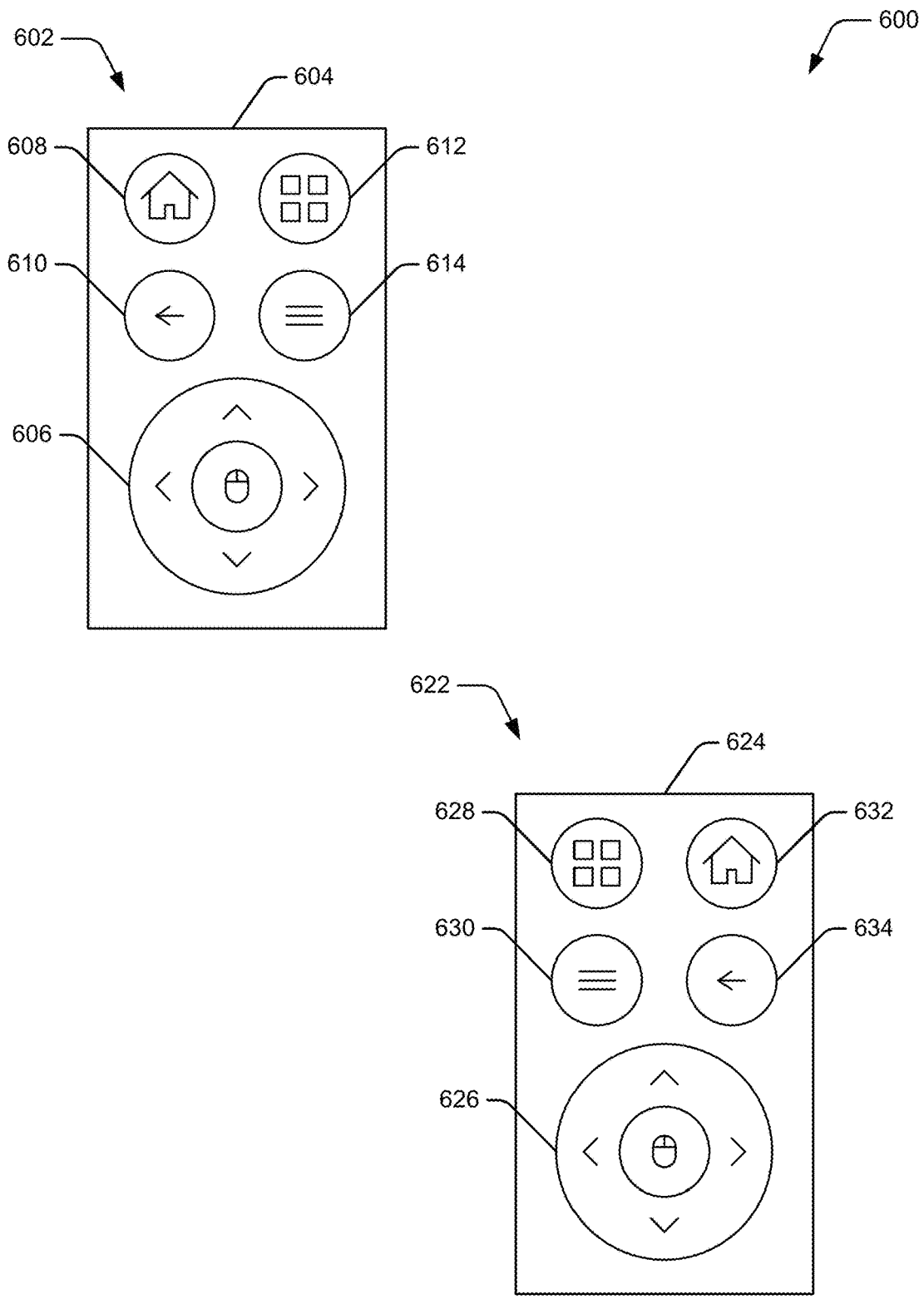
FIG. 6 illustrates examples of implementing configuration settings in a mobile device for user handedness.

FIG. 6 illustrates examples 600 of implementing configuration settings in a mobile device for user handedness. As shown in example 602, a user interface 604 for a remote control is displayed on a display of the mobile device 102. The user interface 604 includes a navigation portion 606 that includes arrow buttons (e.g., to fast forward or rewind, or to navigate through menus associated with the application 116 providing the movie playback) and a center button (e.g., to toggle between pause and play of the move or to navigate through menus associated with the application 116 providing the movie playback). The user interface 604 also includes a home button 608 (e.g., user-selectable to return to a home menu of the application 116 providing the movie playback), a back arrow button 610 (e.g., user-selectable to return to a previous menu of the application 116 providing the movie playback), a setup button 612 (e.g., user-selectable to set various preferences for the application 116 providing the movie playback), and a menu button 614 (e.g., user-selectable to switch to different menus of the application 116 providing the movie playback). The example 602 illustrates configuration settings for right-handed user handedness.

Example 622 also shows a user interface 624 for a remote control is displayed on a display of the mobile device 102. The user interface 624 includes a navigation portion 626 analogous to navigation portion 606. The user interface 624 also includes a home button 632, a back arrow button 634, a setup button 628, and a menu button 630. The buttons 628, 630, 632, and 634 perform the same operations as the buttons 612, 614, 608, and 610, respectively, but the example 622 illustrates configuration settings for left-handed user handedness. As illustrated, in the example 622, the home and back arrow buttons have been moved to the right side of the user interface 624 for left-handed user handedness, and the setup and menu buttons have been moved to the left side of the user interface 624 for left-handed user handedness.

Returning to FIG. 1, a connectivity session is established between the mobile device 102 and the presentation device 104 as discussed above. In one or more implementations, the mobile device configuration settings 220 are output at the beginning of the connectivity session. For example, while establishing the connectivity session, or within a threshold amount of time of establishing the connectivity session (e.g., five seconds), the system 200 generates the mobile device configuration settings 220, which the mobile connectivity module 110 can provide to an application 116 or the operating system 118 of the mobile device 102. The mobile device 102 uses those mobile device configuration settings 220 for the duration of the connectivity session.

Additionally or alternatively, the presentation device configuration settings 218 are output to the presentation device 104 at other times or to other devices. For example, the presentation device configuration settings 218 may be associated with a user identifier (e.g., an account the user logs into) and output to a local or remote data store for storage. When the user provides the user identifier to the presentation device 104 (e.g., logs into the presentation device 104), the configuration settings 218 maintained in the local or remote store are retrieved and used by the presentation device 104 (e.g., until the user logs out of the presentation device 104).

By way of another example, the presentation device configuration settings 218 may be output to the presentation device 104 and stored by the presentation device 104 as associated with the mobile device 102. When the mobile device 102 subsequently communicates with the presentation device 104 (e.g., establishes a connectivity session or otherwise communicates with the presentation device 104) the presentation device 104 identifies the mobile device 102 (e.g., based on a device identifier transmitted by the mobile device 102). The presentation device 104 retrieves the previously stored presentation device configuration settings 218 and uses those presentation device configuration settings 218 until one or more events are detected (e.g., the presentation device 104 identifies a different mobile device communicating with the presentation device 104, the mobile device 102 is no longer communicating with the presentation device 104 (e.g., a connectivity session ends), and so forth.

In one or more implementations, the application 116 or the operating system 118 maintains a record of the configuration settings of the mobile device 102 prior to receipt of the mobile device configuration settings 220. At the end of the connectivity session (e.g., when the mobile connectivity module 110 and the device connectivity module 124 disconnect from one another), the application 116 or the operating system 118 returns the mobile device 102 to the configuration settings the mobile device 102 had prior to receipt of the mobile device configuration settings 220. Additionally or alternatively, the mobile device 102 continues to use the mobile device configuration settings 220 until instructed otherwise, such as via user-input at the mobile device 102, receipt of new mobile device configuration settings 220 from the mobile device configuration determination module 206, and so forth.

Figure 7:
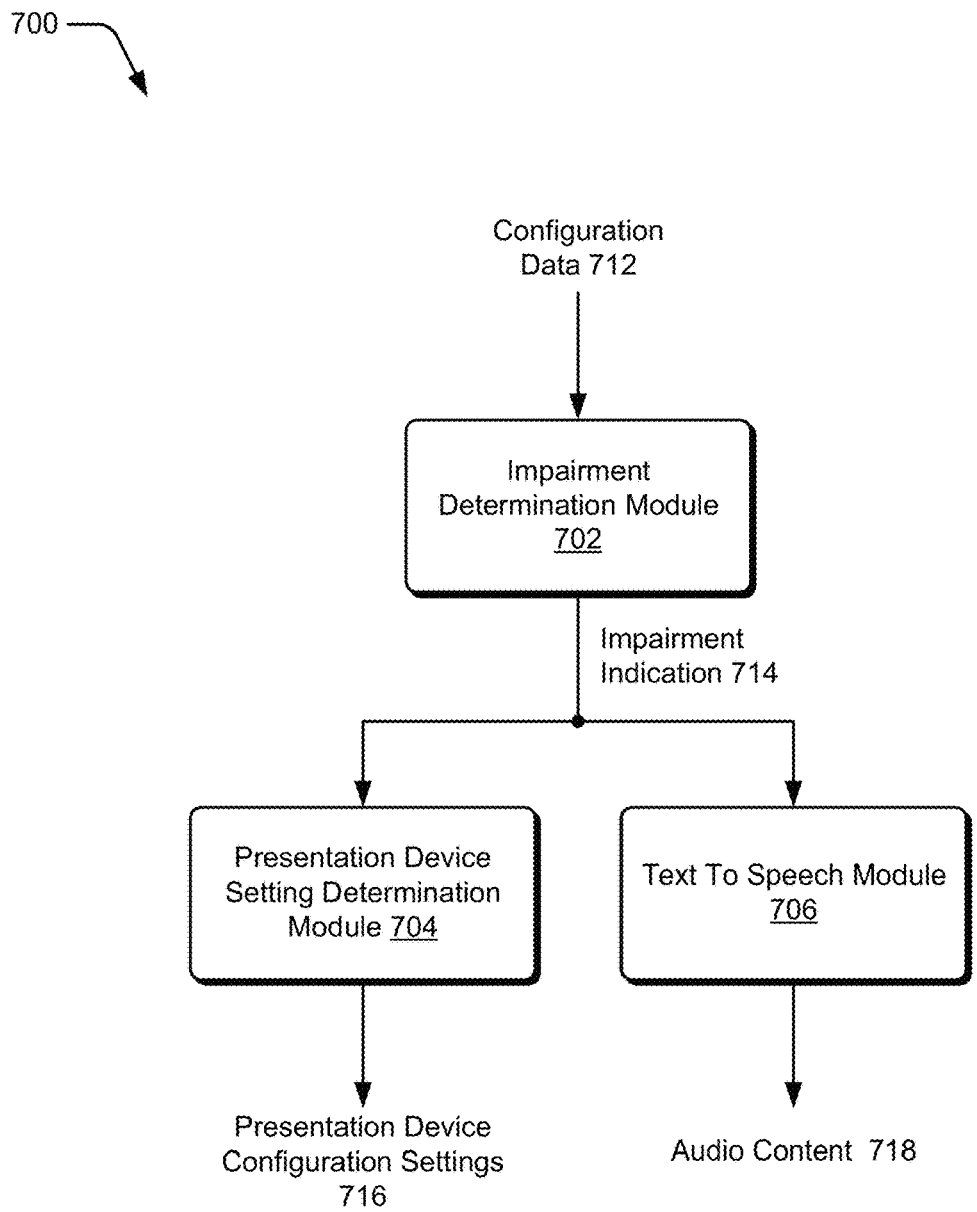
FIG. 7 illustrates an example system implementing the techniques discussed herein.

FIG. 7 illustrates an example system 700 implementing the techniques discussed herein. The system 700 is, for example, included as part of the presentation configuration system 114 of FIG. 1. The system 700 includes an impairment determination module 702, a presentation device setting determination module 704, and a text to speech module 706. Generally, the system 700 determines one or more impairments of the user 108 and outputs one or both of configuration settings for the presentation device 104 that are based on the determined impairment or text content for communication to the presentation device 104. These configuration settings or text content allow the presentation device 104 to correct for the impairment of the user 108, adapting the presentation device 104 to the user 108.

More specifically, the impairment determination module 702 receives configuration data 712 and based on the received data determines an impairment of the user 108. The impairment of a user refers to a disability, deficiency, medical condition, and so forth the user 108 has, such as a disability or deficiency that may make it difficult for the user to watch, hear, or otherwise consume content output by the presentation device 104. Any of a variety of impairments can be determined by the impairment determination module 702, such as color blindness, a hearing loss or impairment, a visual impairment, and so forth.

The configuration data 712 can be obtained from any of a variety of sources, such as from the user (e.g., user input preferences), from a local or remote store of data regarding the user, from a medical provider of the user (e.g., from a doctor, nurse, or other primary care provider of the user), from an employer of the user, from an educational institution that the user attends, and so forth. The impairment determination module 702 provides an indication of the impairment of the user as impairment indication 714 to one or both of the presentation device setting determination module 704 and the speech module 706.

The presentation device setting determination module 704 generates configuration settings for the presentation device 104 based on the impairment indication 714 and outputs these settings to the presentation device 104 as presentation device configuration settings 716. In one or more implementations, the presentation device configuration settings 716 are configuration settings for the presentation device 104 that adapt or configure the presentation of data by the presentation device 104 to correct for the impairment indicated by the impairment indication 714. These configuration settings are, for example, settings to adjust colors displayed by the presentation device 104, settings to alter sound volumes for audio output by the presentation device 104, settings to generate speech from text output by the presentation device 104, and so forth.

The presentation device setting determination module 204 determines the configuration settings for a particular user handedness in any of a variety of different manners. In one or more implementations, the presentation device setting determination module 704 is configured with default configuration settings, such as by a developer or designer of the system 700, which are used as the presentation device configuration settings 716. Additionally or alternatively, user input may be received indicating the configuration settings desired by the user 108. Additionally or alternatively, the configuration settings can be obtained from various sources. For example, an impairment of a hearing loss may be identified from records of an employer or an educational institution but the severity of the hearing loss may be identified by user input.

In one or more implementations, the impairment indication 714 indicates an impairment of color blindness. Various types of color blindness may be indicated, such as deuteranomaly (red-green color blindness), porotanomaly (red-green color blindness), or tritanomaly (blue-yellow color blindness), and so forth. The configuration settings to correct for the particular type of color blindness are identified using any of a variety of public or proprietary techniques. These settings can include changing colors in content communicated to the presentation device 104 from the mobile device 102 as well as background colors displayed by the presentation device 104. For example, external presentation device 104 typically has settings that can be entered manually to correct for each of multiple types of color blindness. In such situations, the presentation device setting determination module 704 determines as the presentation device configuration settings 716 a setting of the type of color blindness.

Additionally or alternatively, the impairment indication 714 indicates an impairment of a hearing loss or impairment. The presentation device setting determination module 704 determines as the presentation device configuration settings 716 an indication to increase the volume of audio, an indication of a particular audio level (e.g., on a scale of 1 to 10), and so forth.

Additionally or alternatively, the impairment indication 714 indicates a visual impairment. The presentation device setting determination module 704 determines as the presentation device configuration settings 716 an indication to perform text to speech, an indication to increase a size of displayed text (e.g., change fonts or font sizes), increase a brightness of the presentation device, and so forth.

The presentation device configuration settings 716 are output to the presentation device 104 to configure or adapt the presentation device 104 to the impairment of the user 108. For example, the presentation configuration system 114 of FIG. 1 provides the presentation device configuration settings 716 to the presentation device 104, such as by using the mobile connectivity module 110 and the device connectivity module 124. The presentation device configuration module 126 receives the presentation device configuration settings 218 and adapts or configures the user interface of the presentation device 104 to correct for the impairment of the user 108 using the presentation device configuration settings 218.

The presentation device configuration module 126 adapts or configures the user interface of the presentation device 104 to correct for the impairment of the user 108 in any of a variety of different manners. For example, in response to a particular audio level, the presentation device configuration module 126 sets the audio level for playback at the presentation device 104 based on the indicated audio level. E.g., if the indicated audio level is 8 on a scale of 1 to 10, the presentation device configuration module 126 sets the audio level at the presentation device 104 to 80% of the maximum audio level. By way of another example, in response to an indication to perform text to speech, the presentation device configuration module 126 activates a text to speech application or program to analyze text in content received from the mobile device 102, generate speech corresponding to the text, and play back the text at the presentation device 104. By way of yet another example, in response to an indication of a particular type of color blindness, the presentation device configuration module 126 accesses an operating system or other settings functionality of the presentation device 104 to activate color correction for the indicated type of color blindness.

Returning to FIG. 1, a connectivity session is established between the mobile device 102 and the presentation device 104. In one or more implementations, the presentation device configuration settings 716 are output to the presentation device 104 at the beginning of the connectivity session. For example, while establishing the connectivity session, or within a threshold amount of time of establishing the connectivity session (e.g., five seconds), the system 700 generates the presentation device configuration settings 716, which the mobile connectivity module 110 can provide to the presentation device 104. The presentation device 104 uses those presentation device configuration settings 716 for the duration of the connectivity session.

Additionally or alternatively, the presentation device configuration settings 716 are output to the presentation device 104 at other times or to other devices. For example, the presentation device configuration settings 716 may be associated with a user identifier (e.g., an account the user logs into) and output to a local or remote data store for storage. When the user provides the user identifier to the presentation device 104 (e.g., logs into the presentation device 104), the configuration settings 716 maintained in the local or remote store are retrieved and used by the presentation device 104 (e.g., until the user logs out of the presentation device 104).

By way of another example, the presentation device configuration settings 716 may be output to the presentation device 104 and stored by the presentation device 104 as associated with the mobile device 102. When the mobile device 102 subsequently communicates with the presentation device 104 (e.g., establishes a connectivity session or otherwise communicates with the presentation device 104) the presentation device 104 identifies the mobile device 102 (e.g., based on a device identifier transmitted by the mobile device 102). The presentation device 104 retrieves the previously stored presentation device configuration settings 716 and uses those presentation device configuration settings 716 until one or more events are detected (e.g., the presentation device 104 identifies a different mobile device communicating with the presentation device 104, the mobile device 102 is no longer communicating with the presentation device 104 (e.g., a connectivity session ends), and so forth.

In one or more implementations, the presentation device configuration module 126 maintains a record of the configuration settings of the presentation device 104 prior to receipt of the presentation device configuration settings 716. At the end of the connectivity session (e.g., when the mobile connectivity module 110 and the device connectivity module 124 disconnect from one another), the presentation device configuration module 126 returns the presentation device 104 to the configuration settings the presentation device 104 had prior to receipt of the presentation device configuration settings 716. Additionally or alternatively, the presentation device 104 continues to use the presentation device configuration settings 716 until instructed otherwise, such as via user-input at the presentation device 104, receipt of new presentation device configuration settings 716 from the mobile device 102 or another mobile device, and so forth.

Returning to FIG. 7, in one or more implementations the impairment determination module 702 outputs the impairment indication 714 to the text to speech module 706. The text to speech module 706 analyzes text in content being communicated to the presentation device 104 and generates audio content 718 corresponding to the text. The audio content 718 is provided to the presentation device 104 along with the other content being output by the presentation device 104 during the connectivity session, such as by using the mobile connectivity module 110 and the device connectivity module 124. The audio content is then played back at the presentation device 104.

Returning to FIG. 1, a connectivity session is established between the mobile device 102 and the presentation device 104 as discussed above. In one or more implementations, the audio content 718 is output at the beginning of the connectivity session. For example, while establishing the connectivity session, or within a threshold amount of time of establishing the connectivity session (e.g., five seconds), the speech module 706 begins generating the audio content 718. At the end of the connectivity session, the 706 ceases generating the audio content 718.

Figure 8:
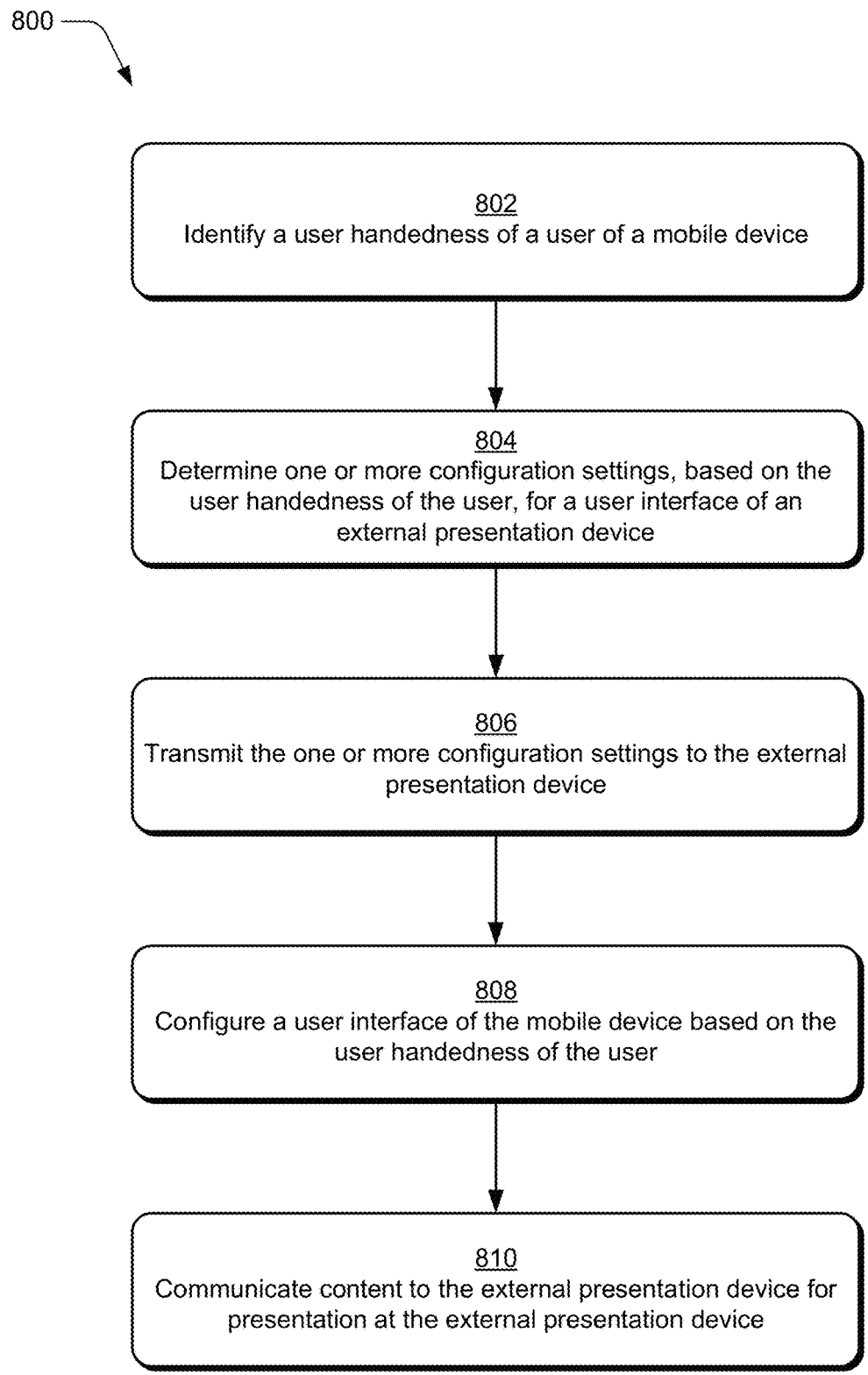
FIG. 8 illustrates an example process for implementing the techniques discussed herein in accordance with one or more embodiments.

FIG. 8 illustrates an example process 800 for implementing the techniques discussed herein in accordance with one or more embodiments. Process 800 is carried out by a mobile device, such as mobile device 102 of FIG. 1, and can be implemented in software, firmware, hardware, or combinations thereof. Process 800 is shown as a set of acts and is not limited to the order shown for performing the operations of the various acts.

In process 800, a user handedness of a user of a mobile device is identified (act 802). The user handedness is identified in various manners, such as by detecting a device grip position of a user grip holding the mobile device.

One or more configuration settings are determined, based on the user handedness of the user, for a user interface of an external presentation device (act 804). The external presentation device is, for example, a monitor or other display device that optionally supports additional content output, such as a speaker to play back audio content. The one or more configuration settings are, for example, locations of user interface elements of the user interface of the external presentation device.

The one or more configuration settings are transmitted to the external presentation device (act 806). The one or more configuration settings are applied at the external presentation device so that the external presentation device is configured for the user handedness of the user.

A user interface of the mobile device is optionally configured based on the user handedness of the user (act 808). This allows the mobile device to be configured for the user handedness of the user.

Content is also optionally communicated to the external presentation device for display or other presentation by the external presentation device (act 810). This content can include audio content, video content, and so forth.

Figure 9:
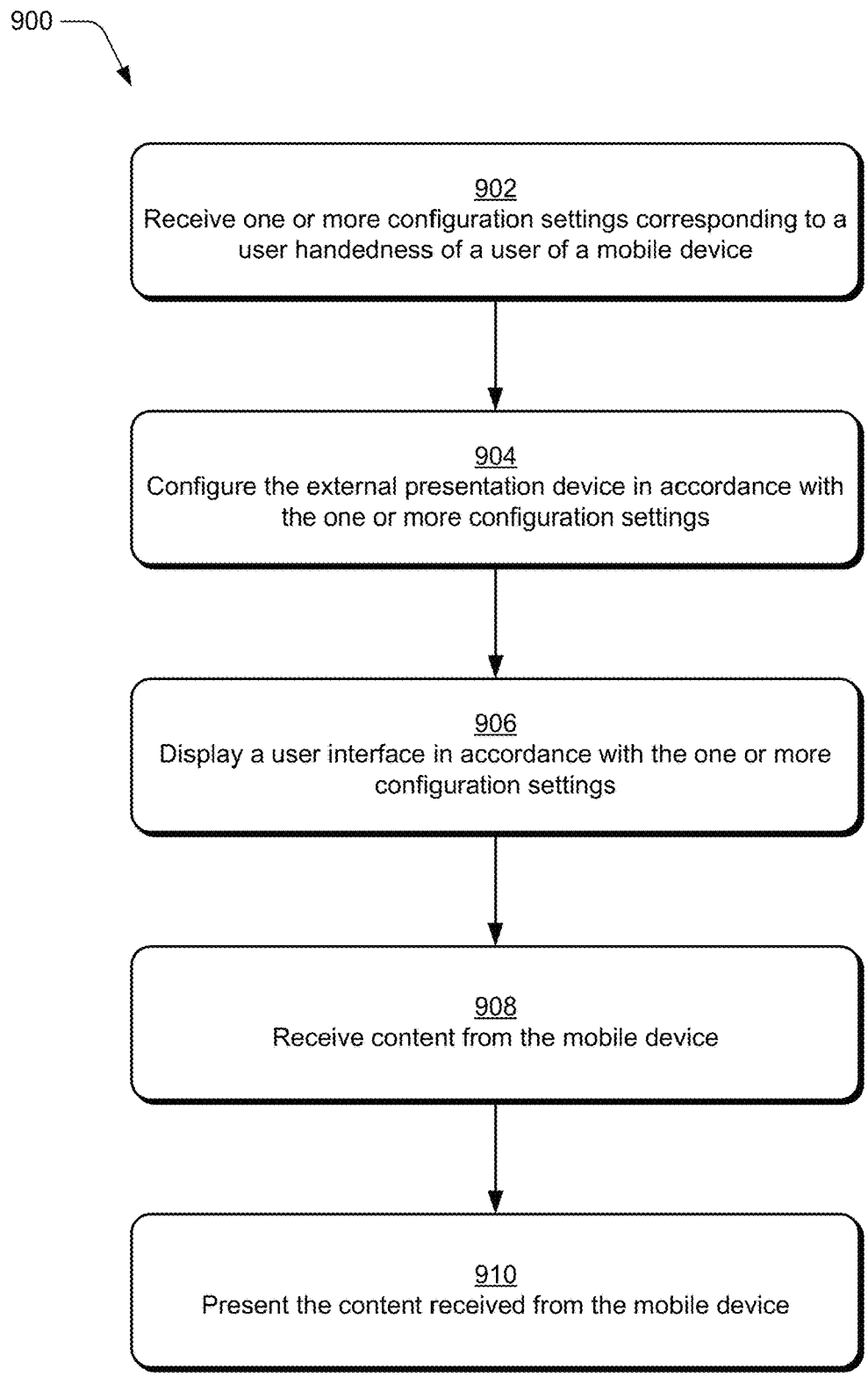
FIG. 9 illustrates an example process for implementing the techniques discussed herein in accordance with one or more embodiments.

FIG. 9 illustrates an example process 900 for implementing the techniques discussed herein in accordance with one or more embodiments. Process 900 is carried out by an external presentation device, such as presentation device 104 of FIG. 1, and can be implemented in software, firmware, hardware, or combinations thereof. Process 900 is shown as a set of acts and is not limited to the order shown for performing the operations of the various acts.

In process 900, one or more configuration settings corresponding to a user handedness of a user of a mobile device are received (act 902). The user handedness of the user is identified by the mobile device.

The external presentation device is configured in accordance with the one or more configuration settings (act 904). The one or more configuration settings are, for example, locations of user interface elements of the user interface of the external presentation device.

A user interface is optionally displayed in accordance with the one or more configuration settings (act 906). For example, user interface elements are displayed at locations indicated by the one or more configuration settings.

Content is optionally received from the mobile device (act 908). This content can be video content, audio content, and so forth.

Content received from the mobile device is presented (act 910). This presentation includes, for example, displaying visual content, playing back audible content, and so forth.

Figure 10:
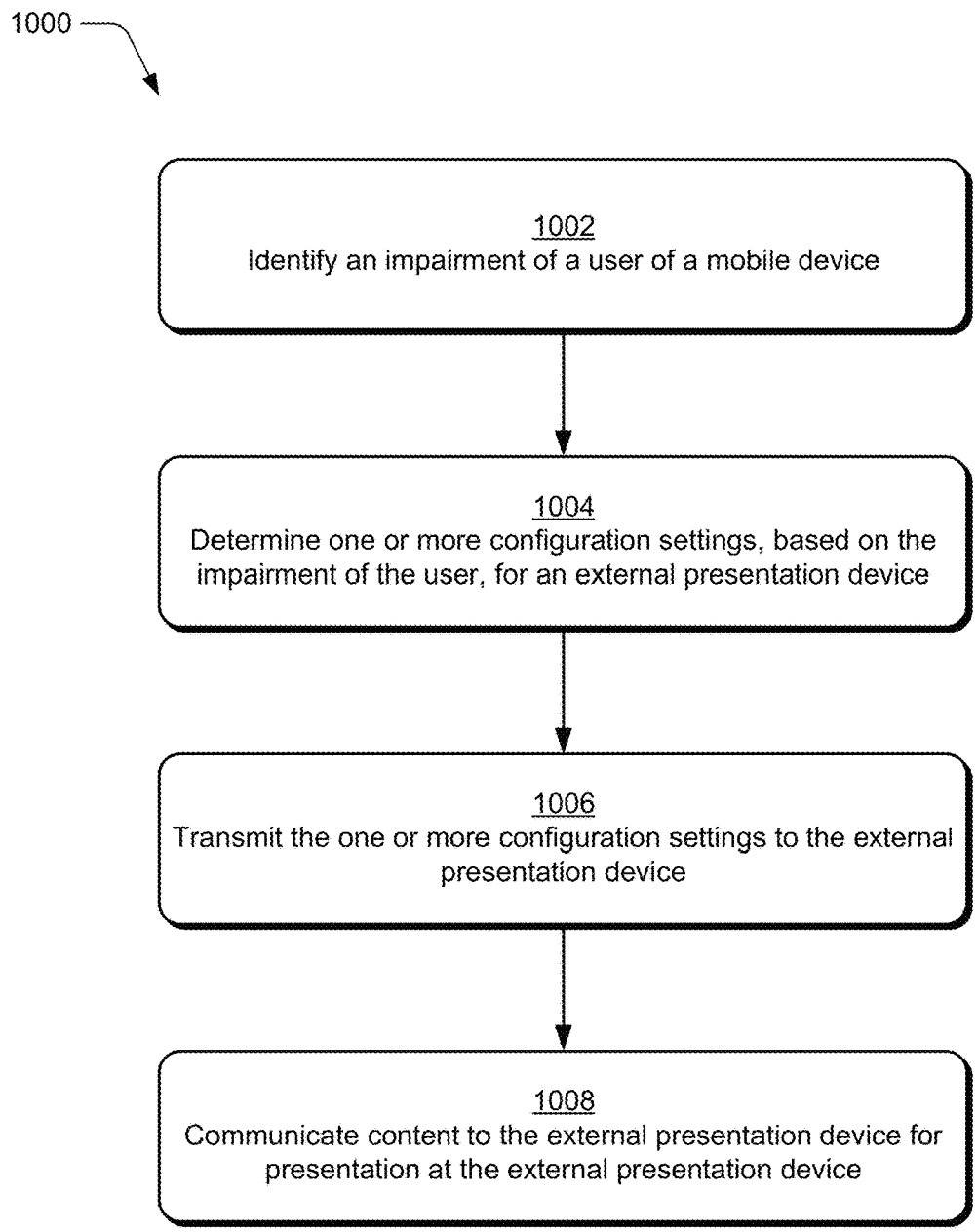
FIG. 10 illustrates an example process for implementing the techniques discussed herein in accordance with one or more embodiments.

FIG. 10 illustrates an example process 1000 for implementing the techniques discussed herein in accordance with one or more embodiments. Process 1000 is carried out by a mobile device, such as mobile device 102 of FIG. 1, and can be implemented in software, firmware, hardware, or combinations thereof. Process 1000 is shown as a set of acts and is not limited to the order shown for performing the operations of the various acts.

In process 1000, an impairment of a user of a mobile device is identified (act 1002). The impairment is identified in various manners, such as from user input specifying the impairment, records obtained from a medical provider, and so forth.

One or more configuration settings are determined, based on the impairment of the user, for a user interface of an external presentation device (act 1004). The external presentation device is, for example, a monitor or other display device that optionally supports additional content output, such as a speaker to play back audio content. The one or more configuration settings are, for example, audio volumes, indications of types of color blindness, and so forth.

The one or more configuration settings are transmitted to the external presentation device (act 1006). The one or more configuration settings are applied at the external presentation device so that the external presentation device is configured to correct for the impairment of the user.

Content is also optionally communicated to the external presentation device for display or other presentation by the external presentation device (act 1008).

Figure 11:
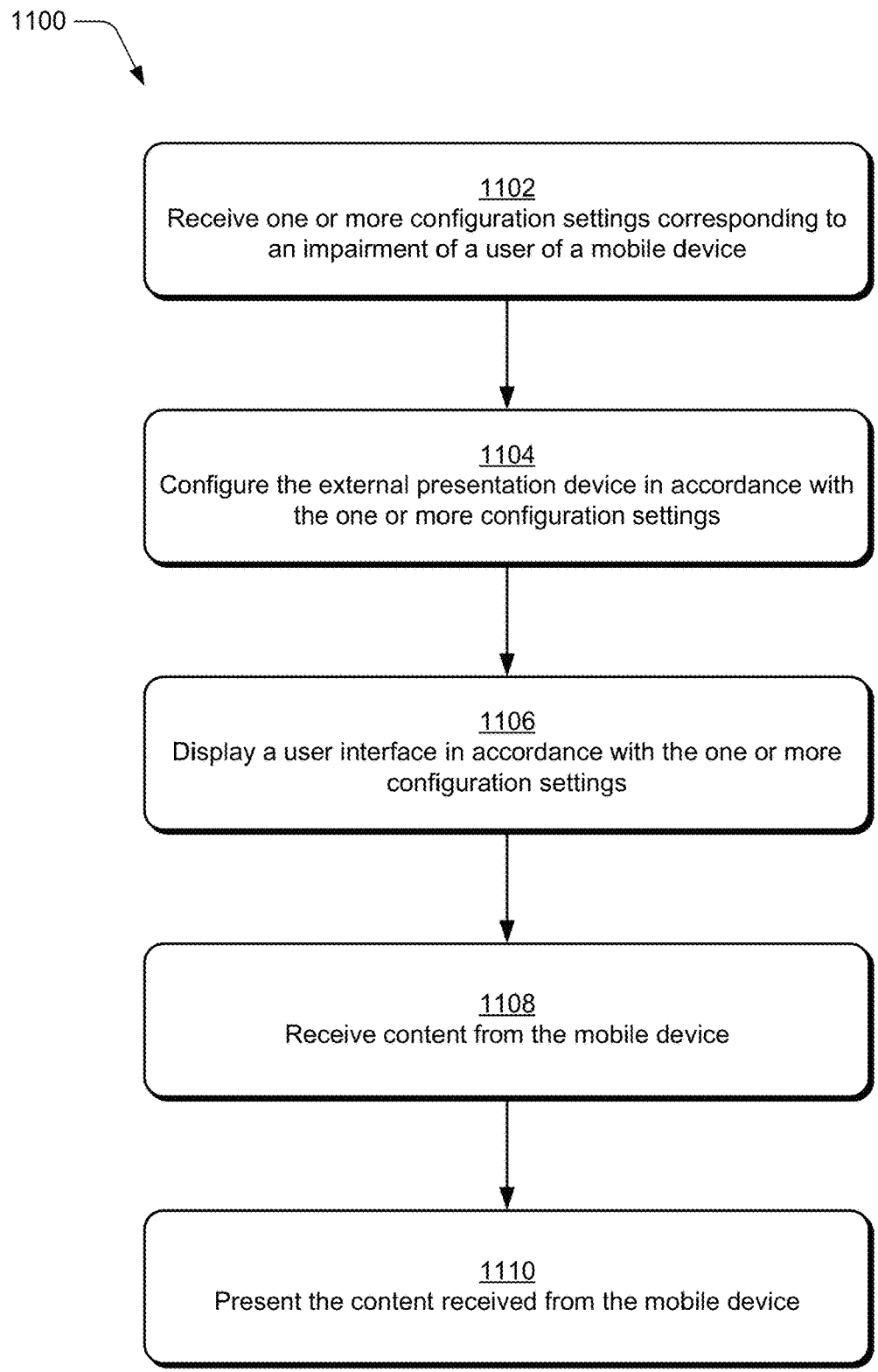
FIG. 11 illustrates an example process for implementing the techniques discussed herein in accordance with one or more embodiments.

FIG. 11 illustrates an example process 1100 for implementing the techniques discussed herein in accordance with one or more embodiments. Process 1100 is carried out by an external presentation device, such as presentation device 104 of FIG. 1, and can be implemented in software, firmware, hardware, or combinations thereof. Process 1100 is shown as a set of acts and is not limited to the order shown for performing the operations of the various acts.

In process 1100, one or more configuration settings corresponding to an impairment of a user of a mobile device are received (act 1102). The impairment of the user is identified by the mobile device.

The external presentation device is configured in accordance with the one or more configuration settings (act 1104). The one or more configuration settings are, for example, audio volumes, indications of types of color blindness, and so forth.

A user interface is displayed in accordance with the one or more configuration settings (act 1106). For example, audio is played back at a volume indicated by the one or more configuration settings, colors are displayed to correct for color blindness indicated in the one or more configuration settings, and so forth. In one or more implementations act 1106 is optional.

Content is optionally received from the mobile device (act 1108). This content can be video content, audio content, and so forth.

Content received from the mobile device is presented (act 1110). This presentation includes, for example, displaying visual content, playing back audible content, and so forth.

Figure 12:
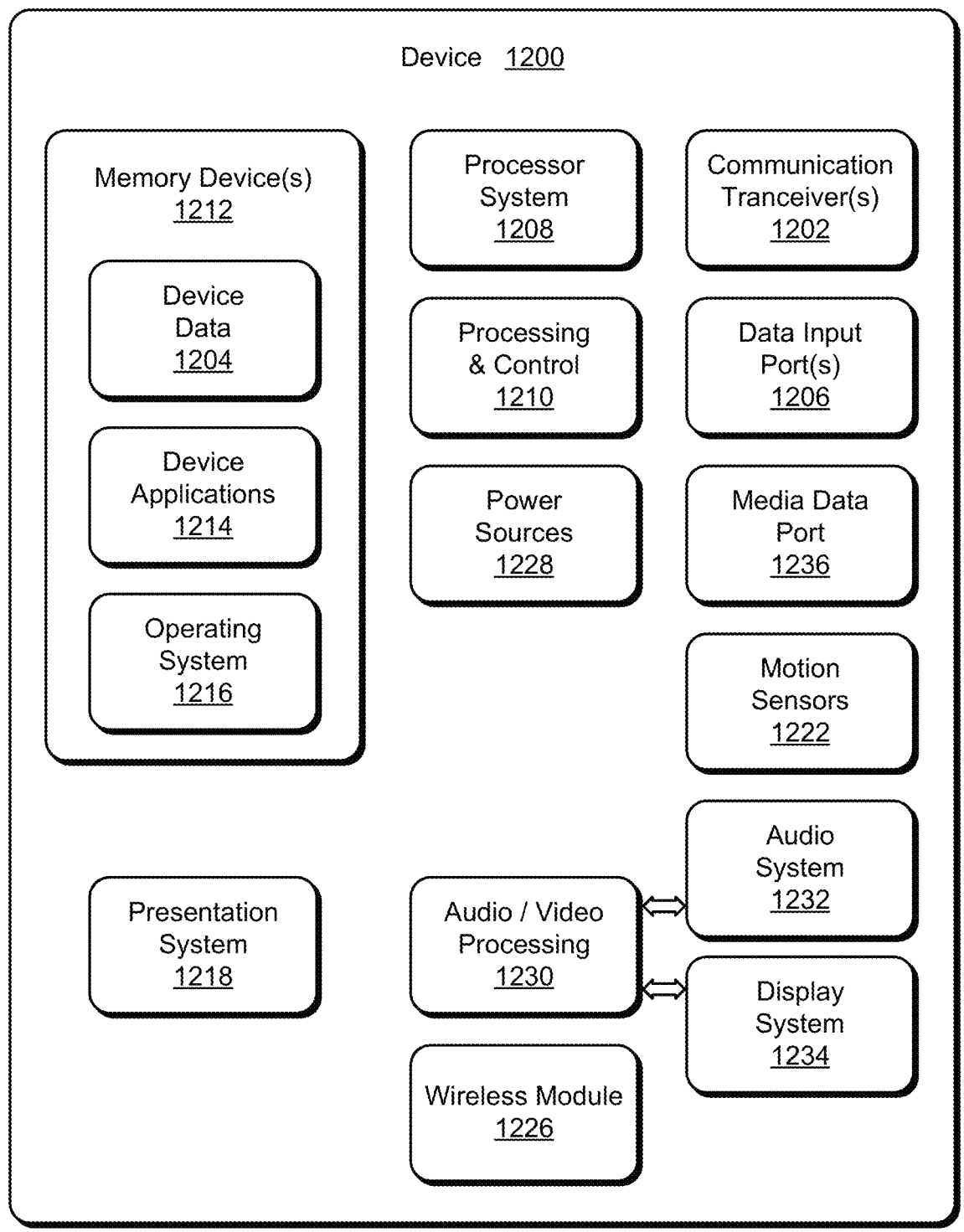
FIG. 12 illustrates various components of an example device in which aspects of the techniques discussed herein can be implemented.

FIG. 12 illustrates various components of an example device 1200 in which aspects of configuring an external presentation device based on user handedness can be implemented. The example device 1200 can be implemented as any of the devices described with reference to the previous FIGS. 1-11, such as any type of mobile device, mobile phone, mobile device, wearable device, tablet, computing, communication, entertainment, gaming, media playback, and/or other type of electronic device. For example, the mobile device 102 and/or the presentation device 104 as shown and described with reference to FIGS. 1-11 may be implemented as the example device 1200. In a wearable device implementation, the device may include any one or combination of a watch, armband, wristband, bracelet, glove or pair of gloves, glasses, jewelry items, clothing items, any type of footwear or headwear, and/or other types of wearables.

The device 1200 includes communication transceivers 1202 that enable wired and/or wireless communication of device data 1204 with other devices. The device data 1204 can include any of device identifying data, device location data, wireless connectivity data, and wireless protocol data. Additionally, the device data 1204 can include any type of audio, video, and/or image data. Example communication transceivers 1202 include wireless personal area network (WPAN) radios compliant with various IEEE 1002.15 (Bluetooth™) standards, wireless local area network (WLAN) radios compliant with any of the various IEEE 1002.11 (Wi-Fi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1200 may also include one or more data input ports 1206 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1200 includes a processing system 1208 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Additionally or alternatively, the device can be implemented with any one or combination of software, hardware, firmware, or fixed logic circuitry that is implemented in connection with processing and control circuits, which are generally identified at 1210. The device 1200 may further include any type of a system bus or other data and command transfer system that couples the various components within the device. A system bus can include any one or combination of different bus structures and architectures, as well as control and data lines.

The device 1200 also includes computer-readable storage memory 1212 (e.g., memory devices) that enable data storage, such as data storage devices that can be accessed by a computing device, and that provide persistent storage of data and executable instructions (e.g., software applications, programs, functions, and the like). Examples of the computer-readable storage memory 1212 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1200 may also include a mass storage media device.

The computer-readable storage memory 1212 provides data storage mechanisms to store the device data 1204, other types of information and/or data, and various device applications 1214 (e.g., software applications). For example, an operating system 1216 can be maintained as software instructions with a memory device and executed by the processing system 1208. The device applications may also include a device manager, such as any form of a control application, software application, signal-processing and control module, code that is native to a particular device, a hardware abstraction layer for a particular device, and so on. Computer-readable storage memory 1212 represents media and/or devices that enable persistent and/or non-transitory storage of information in contrast to mere signal transmission, carrier waves, or signals per se. Computer-readable storage memory 1212 do not include signals per se or transitory signals.

In this example, the device 1200 includes a presentation system 1218 that implements aspects of the techniques discussed herein and may be implemented with hardware components and/or in software as one of the device applications 1214. For example, the presentation system 1218 can be implemented as the presentation configuration system 114 described in detail above. In implementations, the presentation system 1218 may include independent processing, memory, and logic components as a computing and/or electronic device integrated with the device 1200.

In this example, the example device 1200 also includes sensors 1222. The sensors 1222 are representative of functionality to detect various physical and/or logical phenomena in relation to the example device 1200, such as motion, light, image detection and recognition, time and date, position, location, touch detection, sound, temperature, and so forth. Examples of the sensors include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. Sensors 1222 also optionally include other environmental sensors, such as a camera, a microphone, and so forth.

The device 1200 also includes a wireless module 1226, which is representative of functionality to perform various wireless communication tasks. For instance, for the mobile device 102 and/or the presentation device 104, the wireless module 1226 can be leveraged to scan for and detect wireless networks, as well as negotiate wireless connectivity to wireless networks for the mobile device 102 and/or the presentation device 104. Additionally or alternatively, the wireless module 1226 can enable direct device-to-device wireless connectivity between the mobile device 102 and the presentation device 104. The device 1200 can also include one or more power sources 1228, such as when the device is implemented as a mobile device. The power sources 1228 may include a charging and/or power system, and can be implemented as a flexible strip battery, a rechargeable battery, a charged super-capacitor, and/or any other type of active or passive power source.

The device 1200 also includes an audio and/or video processing system 1230 that generates audio data for an audio system 1232 and/or generates display data for a display system 1234. The audio system and/or the display system may include any devices that process, display, and/or otherwise render audio, video, display, and/or image data. Display data and audio signals can be communicated to an audio component (e.g., a speaker, headset, earbuds) and/or to a display component via an RF (radio frequency) link, S-video link, HDMI (high-definition multimedia interface), composite video link, component video link, DVI (digital video interface), analog audio connection, or other similar communication link, such as media data port 1236. In implementations, the audio system and/or the display system are integrated components of the example device. Alternatively, the audio system and/or the display system are external, peripheral components to the example device.

Although implementations of configuring an external presentation device based on user handedness have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a method, including: identifying a user handedness of a user of a mobile device; determining one or more configuration settings, based on the user handedness of the user, for a user interface of an external display device; and transmitting the one or more configuration settings to the external display device.

In some aspects, the techniques described herein relate to a method, further including communicating content to the external display device for display by the external display device.

In some aspects, the techniques described herein relate to a method, further including automatically configuring a user interface of the mobile device based on the user handedness of the user.

In some aspects, the techniques described herein relate to a method, the automatically configuring the user interface of the mobile device including identifying locations of user interface elements of the user interface of the mobile device, wherein the user interface elements have different locations in the user interface if the user handedness is left-handed than if the user handedness is right-handed.

In some aspects, the techniques described herein relate to a method, the identifying the user handedness of the user including identifying the user handedness of the user by detecting a device grip position of a user grip holding the mobile device.

In some aspects, the techniques described herein relate to a method, the identifying the user handedness of the user including identifying the user handedness of the user based on whether the mobile device is being held in a single-handed manner or in a multi-handed manner.

In some aspects, the techniques described herein relate to a method, the determining one or more configuration settings including identifying locations of user interface elements of the user interface, wherein the user interface elements have different locations in the user interface if the user handedness is left-handed than if the user handedness is right-handed.

In some aspects, the techniques described herein relate to a method, the user interface elements including one or more of an icon, a widget, and a button.

In some aspects, the techniques described herein relate to a method, further including: establishing a connectivity session between the mobile device and the external display device; communicating, during the connectivity session, content to the external display device for output by the external display device; detecting, during the connectivity session, that a user handedness of the user has changed to a new user handedness; determining one or more new configuration settings, based on the new user handedness of the user, for the user interface of the external display device; and transmitting the one or more new configuration settings to the external display device.

In some aspects, the techniques described herein relate to a method including: receiving, at an external presentation device, one or more configuration settings from a mobile device, the one or more configuration settings including configuration settings corresponding to a user handedness, detected by the mobile device, of a user of the mobile device; and configuring, in response to receiving the one or more configuration settings, the external presentation device in accordance with the one or more configuration settings.

In some aspects, the techniques described herein relate to a method, the one or more configuration settings including locations of user interface elements of the user interface, wherein the user interface elements have different locations in the user interface if the user handedness is left-handed than if the user handedness is right-handed.

In some aspects, the techniques described herein relate to a method, the user interface elements including one or more of an icon, a widget, and a button.

In some aspects, the techniques described herein relate to a mobile device including: a user handedness determination module, implemented at least in part in hardware, to identify a user handedness of a user of the mobile device; a presentation device setting determination module, implemented at least in part in hardware, to determine one or more configuration settings, based on the user handedness of the user, for a user interface of an external display device; and a mobile connectivity module, implemented at least in part in hardware, to transmit the one or more configuration settings to the external display device.

In some aspects, the techniques described herein relate to a mobile device, wherein the mobile connectivity module is further to communicate content to the external display device for display by the external display device.

In some aspects, the techniques described herein relate to a mobile device, further including a mobile device configuration module to determine one or more configuration settings for the mobile device based on the user handedness of the user, and a program to configure a user interface of the mobile device in accordance with the one or more configuration settings for the mobile device.

In some aspects, the techniques described herein relate to a mobile device, the one or more configuration settings for the mobile device identifying locations of user interface elements of the user interface of the mobile device, wherein the user interface elements have different locations in the user interface of the mobile device if the user handedness is left-handed than if the user handedness is right-handed.

In some aspects, the techniques described herein relate to a mobile device, wherein to identify the user handedness of the user is to identify the user handedness of the user by detecting a device grip position of a user grip holding the mobile device.

In some aspects, the techniques described herein relate to a mobile device, wherein to identify the user handedness of the user is to identify the user handedness of the user based on whether the mobile device is being held in a single-handed manner or in a multi-handed manner.

In some aspects, the techniques described herein relate to a mobile device, wherein to determine the one or more configuration settings is to identify locations of user interface elements of the user interface, wherein the user interface elements have different locations in the user interface if the user handedness is left-handed than if the user handedness is right-handed.

In some aspects, the techniques described herein relate to a mobile device, the user interface elements including one or more of an icon, a widget, and a button.

The invention claimed is:

1. A method comprising:
   identifying, by a mobile device, a user handedness of a user of the mobile device, the user handedness indicating whether the mobile device is being operated with a right hand or a left hand of the user;
   determining, by the mobile device, one or more configuration settings for a user interface of an external display device that is separate from the mobile device based on the user handedness, the one or more configuration settings being different based on whether the mobile device is being operated with the right hand or the left hand;
   transmitting the one or more configuration settings from the mobile device to the external display device; and
   communicating content from the mobile device to the external display device for display by the external display device in accordance with the one or more configuration settings.

2. The method of claim 1, further comprising automatically configuring an additional user interface of the mobile device based on the user handedness of the user.

3. The method of claim 2, the automatically configuring the additional user interface of the mobile device including identifying locations of user interface elements of the additional user interface of the mobile device, wherein the user interface elements have different locations in the additional user interface if the user handedness is left-handed than if the user handedness is right-handed.

4. The method of claim 2, wherein the additional user interface of the mobile device includes user interface elements for remotely controlling the content that is displayed by the external display device in accordance with the one or more configuration settings, wherein the user interface elements have different locations in the additional user interface if the user handedness is left-handed than if the user handedness is right-handed.

5. The method of claim 1, the identifying the user handedness of the user including identifying the user handedness of the user by detecting a device grip position of a user grip holding the mobile device.

6. The method of claim 5, the detecting the device grip position including determining a thumb region of the device grip position of the user grip holding the mobile device on a first side of the mobile device, and a finger region of the device grip position of the user grip holding the mobile device on a second side of the mobile device.

7. The method of claim 1, the identifying the user handedness of the user including identifying the user handedness of the user based on whether the mobile device is being held in a single-handed manner or in a multi-handed manner.

8. The method of claim 7, the identifying the user handedness of the user including determining that the mobile device is being used in the multi-handed manner by detecting additional touch input on a display of the mobile device that is separate from touch input detected in a finger region of a grip position of the mobile device and is separate from touch input detected in a thumb region of the grip position of the mobile device.

9. The method of claim 8, wherein the identifying the user handedness further includes:
   determining that the mobile device is being held by a user in one hand of the right hand or the left hand; and
   determining that the mobile device is being operated by a different hand of the right hand or the left hand based on the mobile device being held in the multi-handed manner.

10. The method of claim 1, the determining the one or more configuration settings including identifying locations of user interface elements of the user interface, wherein the user interface elements have different locations in the user interface if the user handedness is left-handed than if the user handedness is right-handed, the user interface elements including one or more icons.

11. The method of claim 1, further comprising:
   establishing a connectivity session between the mobile device and the external display device;
   communicating, during the connectivity session, the content from the mobile device to the external display device;
   detecting, during the connectivity session, that the user handedness of the user has changed to a new user handedness, the new user handedness indicating that the user changed from operating the mobile device with one hand of the right hand or the left hand to operating the mobile device with a different hand of the right hand or the left hand;
   determining one or more new configuration settings for the user interface of the external display device based on the new user handedness; and transmitting the one or more new configuration settings to the external display device.

12. The method of claim 1, the determining the one or more configuration settings including identifying which side of a finger touching a touchscreen of the external display device a menu is to be displayed, wherein the menu is displayed on a different side of the finger if the user handedness is left-handed than if the user handedness is right-handed.

13. The method of claim 1, the determining the one or more configuration settings including indicating a tilt angle of a pointer displayed on the external display device, wherein the tilt angle is different if the user handedness is left-handed than if the user handedness is right-handed.

14. A method comprising:
receiving, at an external presentation device that is separate from a mobile device, first one or more configuration settings from the mobile device, the first one or more configuration settings including configuration settings for a user interface of the external presentation device corresponding to a user handedness, detected by the mobile device, of a user of the mobile device, the first one or more configuration settings being different based on whether the user handedness indicates that the mobile device is being operated with a right hand or a left hand of the user; and
configuring, in response to receiving the first one or more configuration settings, the external presentation device that is separate from the mobile device in accordance with the first one or more configuration settings.

15. The method of claim 14, the first one or more configuration settings including locations of user interface elements of the user interface, wherein the user interface elements have different locations in the user interface if the user handedness is left-handed than if the user handedness is right-handed.

16. The method of claim 14, further comprising:
establishing a connectivity session between the external presentation device and the mobile device;
receiving, as part of the connectivity session, the first one or more configuration settings;
maintaining a record of a second one or more configuration settings that the external presentation device had prior to receiving the first one or more configuration settings; and
returning, in response to the connectivity session ending, the external presentation device to the second one or more configuration settings.

17. The method of claim 14, further comprising:
establishing a first connectivity session between the external presentation device and the mobile device;
receiving, as part of the first connectivity session, the first one or more configuration settings;
storing the first one or more configuration settings as associated with the mobile device;
ending the first connectivity session;
subsequently establishing a second connectivity session between the external presentation device and the mobile device;
retrieving the stored first one or more configuration settings; and
configuring the external presentation device in accordance with the first one or more configuration settings.

18. A mobile device comprising:
a user handedness determination module, implemented at least in part in hardware, to identify a user handedness of a user of the mobile device, the user handedness indicating whether the mobile device is being operated with a right hand or a left hand of the user;
a presentation device setting determination module, implemented at least in part in hardware, to determine one or more configuration settings for a user interface of an external display device that is separate from the mobile device based on the user handedness, the one or more configuration settings being different based on whether the mobile device is being operated with the right hand or the left hand; and
a mobile connectivity module, implemented at least in part in hardware, to transmit the one or more configuration settings to the external display device and to communicate content to the external display device for display by the external display device in accordance with the one or more configuration settings.

19. The mobile device of claim 18, wherein to identify the user handedness of the user, the user handedness determination module is configured to:
determine that the mobile device is held by a thumb of the user on a first side of the mobile device in a thumb region; and
determine that the mobile device is held by one or more fingers of the user on a second side of the mobile device in a finger region.

20. The mobile device of claim 19, wherein the user handedness is different based on whether the thumb region and the finger region of the mobile device held are located on a right hand side or a left hand side of the mobile device.

\* \* \* \* \*